United States Patent
Sato et al.

(10) Patent No.: US 7,722,977 B2
(45) Date of Patent: May 25, 2010

(54) FUEL CELL STACK COMPRISING CURRENT COLLECTOR PROVIDED AT LEAST AT ONE FLUID PASSAGE

(75) Inventors: Masahiko Sato, Utsunomiya (JP); Takahiro Takai, Utsunomiya (JP); Makoto Tsuji, Saitama (JP); Masao Utsunomiya, Utsunomiya (JP); Hayato Kaji, Kawachi-gun (JP); Shuhei Goto, Utsunomiya (JP); Satoru Terada, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 757 days.

(21) Appl. No.: 11/198,779

(22) Filed: Aug. 5, 2005

(65) Prior Publication Data

US 2006/0040159 A1 Feb. 23, 2006

(30) Foreign Application Priority Data

Aug. 20, 2004 (JP) .............................. 2004-240660
Sep. 28, 2004 (JP) .............................. 2004-281878
Nov. 24, 2004 (JP) .............................. 2004-339001

(51) Int. Cl.
  *H01M 2/00* (2006.01)
  *H01M 2/02* (2006.01)
  *H01M 8/12* (2006.01)

(52) U.S. Cl. .............................. 429/34; 429/35; 429/36; 429/26

(58) Field of Classification Search .................. 429/13, 429/26, 30, 33–35, 38; 204/284, 286.1, 288, 204/290.01; 174/129 R; 164/47, 269, 416, 164/478

See application file for complete search history.

(56) References Cited

U.S. PATENT DOCUMENTS

| | | | | |
|---|---|---|---|---|
| 3,667,534 A | * | 6/1972 | Kanokogi et al. | 164/478 |
| 3,969,145 A | * | 7/1976 | Grevstad et al. | 429/26 |
| 4,354,917 A | * | 10/1982 | Solomon | 204/284 |
| 4,371,433 A | | 2/1983 | Balko et al. | |
| 6,489,050 B1 | * | 12/2002 | Ruhl et al. | 429/26 |
| 6,521,368 B2 | | 2/2003 | Okazaki | |

(Continued)

FOREIGN PATENT DOCUMENTS

JP  6-196177  7/1994

(Continued)

OTHER PUBLICATIONS

Japanese Office Action for Application No. 2004-339001, dated Jun. 16, 2009.

(Continued)

*Primary Examiner*—Dah-Wei D Yuan
*Assistant Examiner*—Claire L Rademaker
(74) *Attorney, Agent, or Firm*—Lahive & Cockfield, LLP; Anthony A. Laurentano, Esq.

(57) ABSTRACT

A terminal plate, an insulating plate, and an end plate are stacked on a stack body. The terminal plate has current collectors at least at lower portions of an oxygen-containing gas supply passage, a coolant supply passage, a fuel gas discharge passage, a fuel gas supply passage, a coolant discharge passage, and an oxygen-containing gas discharge passage. The current collectors contact the water generated in the reaction or a coolant for collecting electricity.

9 Claims, 39 Drawing Sheets

U.S. PATENT DOCUMENTS

| | | |
|---|---|---|
| 6,638,655 B2 | 10/2003 | Gyoten et al. |
| 6,846,590 B2 | 1/2005 | Nishiyama et al. |
| 7,294,423 B2 | 11/2007 | Hase et al. |
| 2001/0049044 A1* | 12/2001 | Molter ........................ 429/34 |
| 2002/0058177 A1* | 5/2002 | Nishiyama et al. ............ 429/35 |
| 2003/0175573 A1* | 9/2003 | Yoo et al. ..................... 429/34 |
| 2004/0028994 A1* | 2/2004 | Akikusa et al. ............... 429/44 |
| 2004/0142226 A1 | 7/2004 | Yamauchi et al. |
| 2005/0079397 A1* | 4/2005 | Winkelmann et al. ......... 429/26 |
| 2008/0079186 A1 | 4/2008 | Hase et al. |

FOREIGN PATENT DOCUMENTS

| | | |
|---|---|---|
| JP | 11-354142 | 12/1999 |
| JP | 2000-21418 | 1/2000 |
| JP | 2001-155761 | 6/2001 |
| JP | 2001-229932 | 8/2001 |
| JP | 2001-243970 | 9/2001 |
| JP | 2001-297784 | 10/2001 |
| JP | 2002-124292 | 4/2002 |
| JP | 2004-31010 | 1/2004 |
| JP | 2004-165043 | 6/2004 |
| WO | WO 03/088395 A1 | 10/2003 |

OTHER PUBLICATIONS

Japanese Office Action for Application No. 2004-240660, dated Oct. 20, 2009.

Japanese Office Action for Application No. 2004-281878, dated Oct. 20, 2009.

* cited by examiner

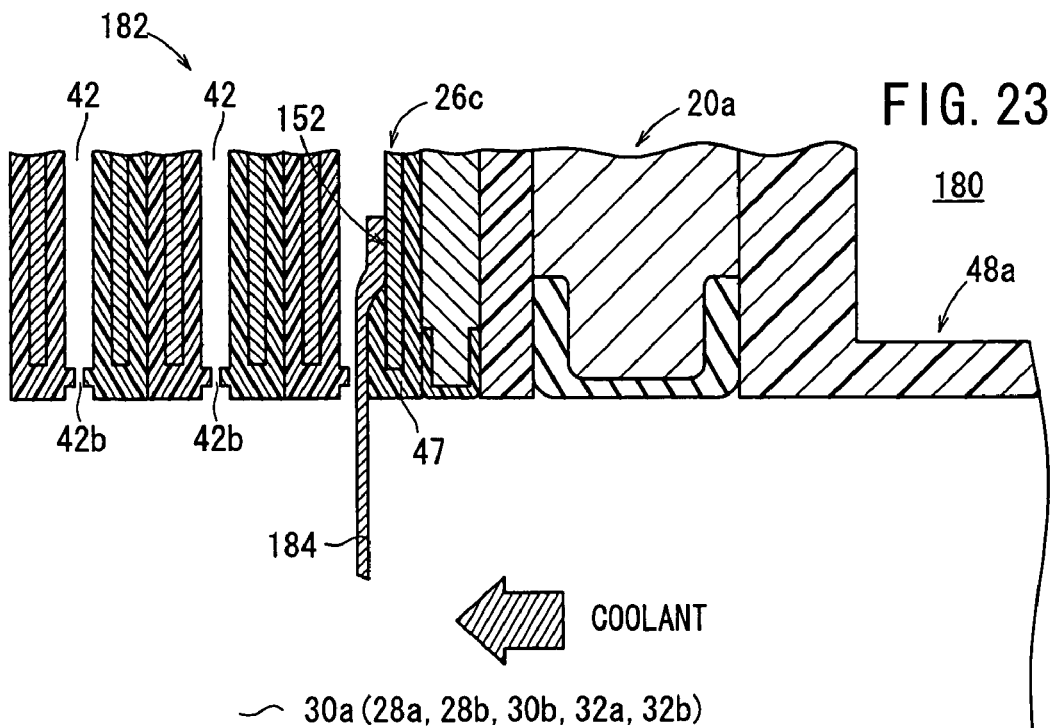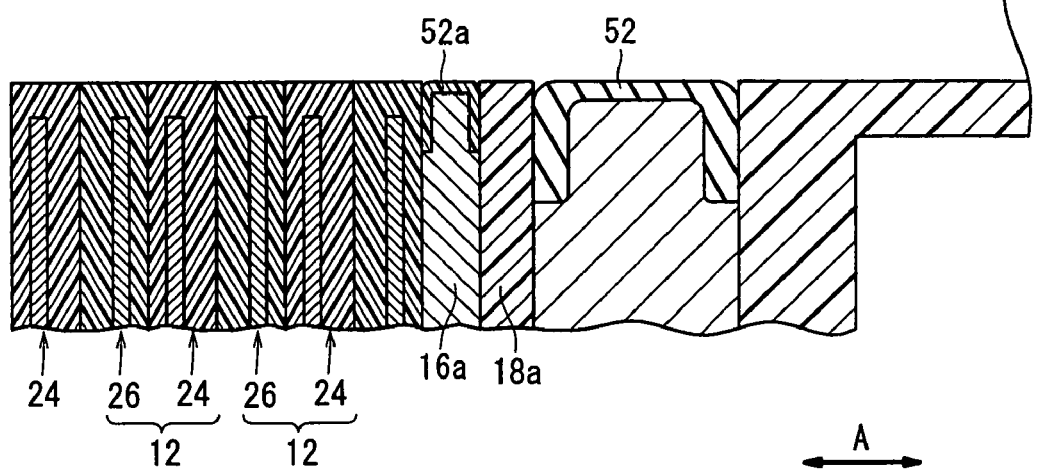
FIG. 23

FIG. 35
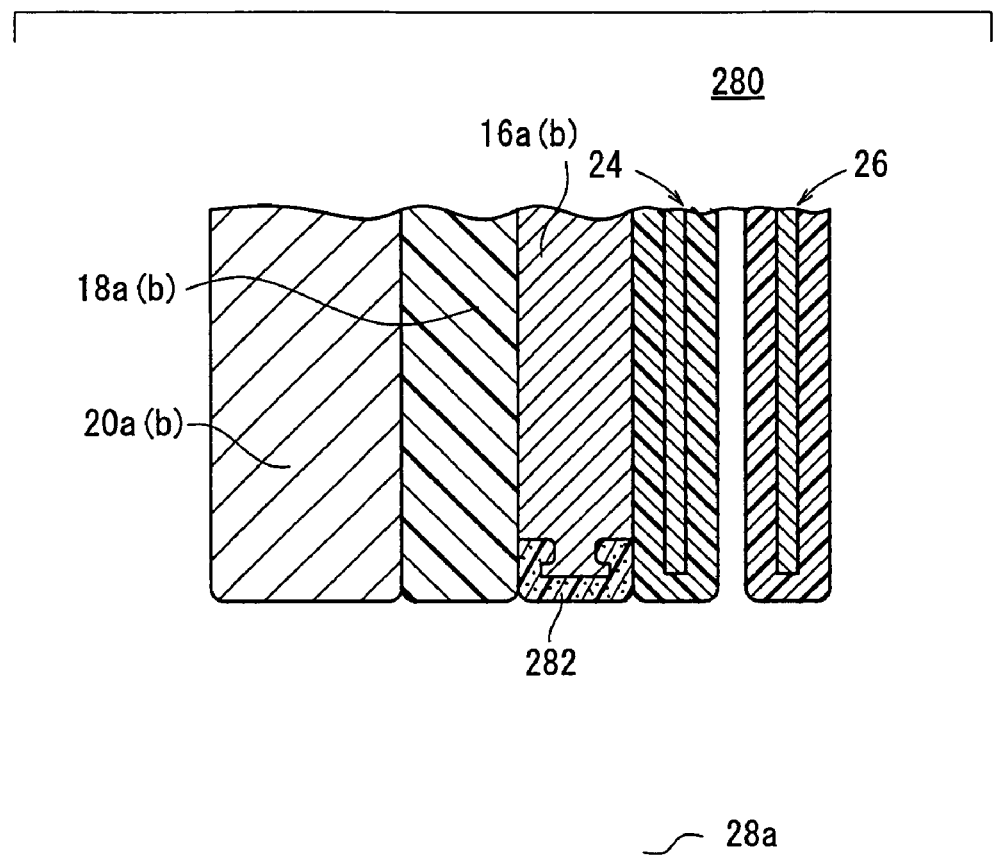
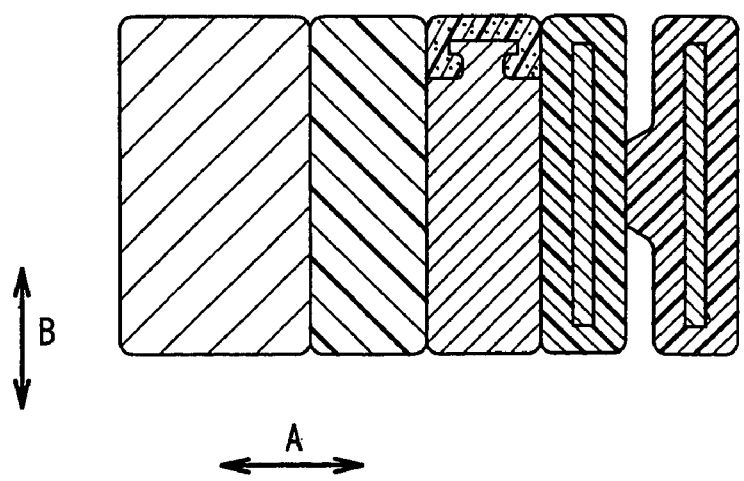

FIG. 36
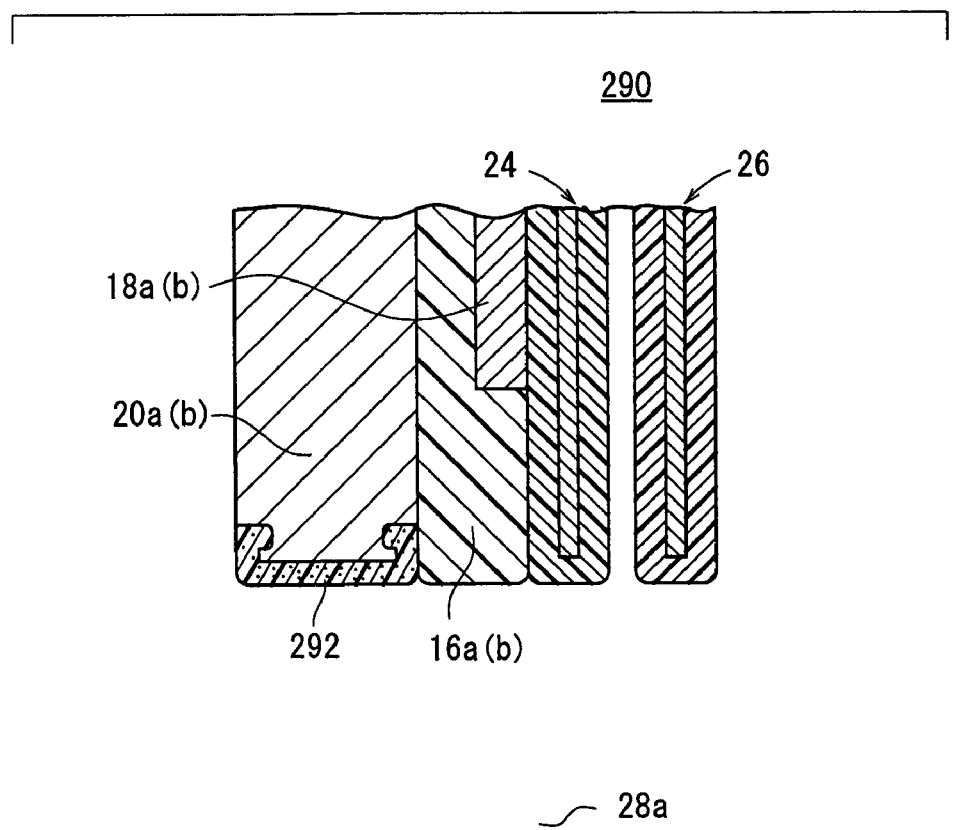
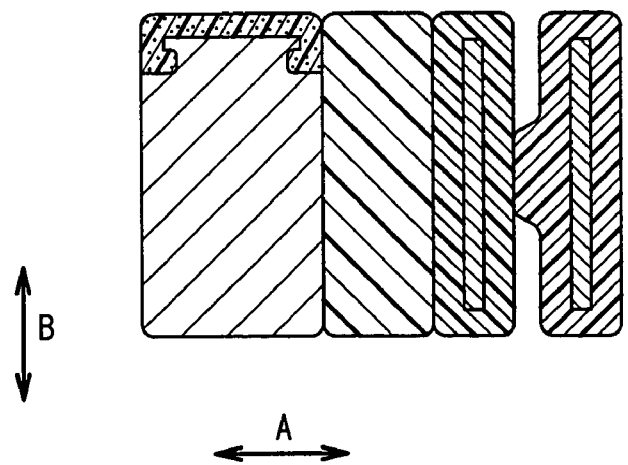

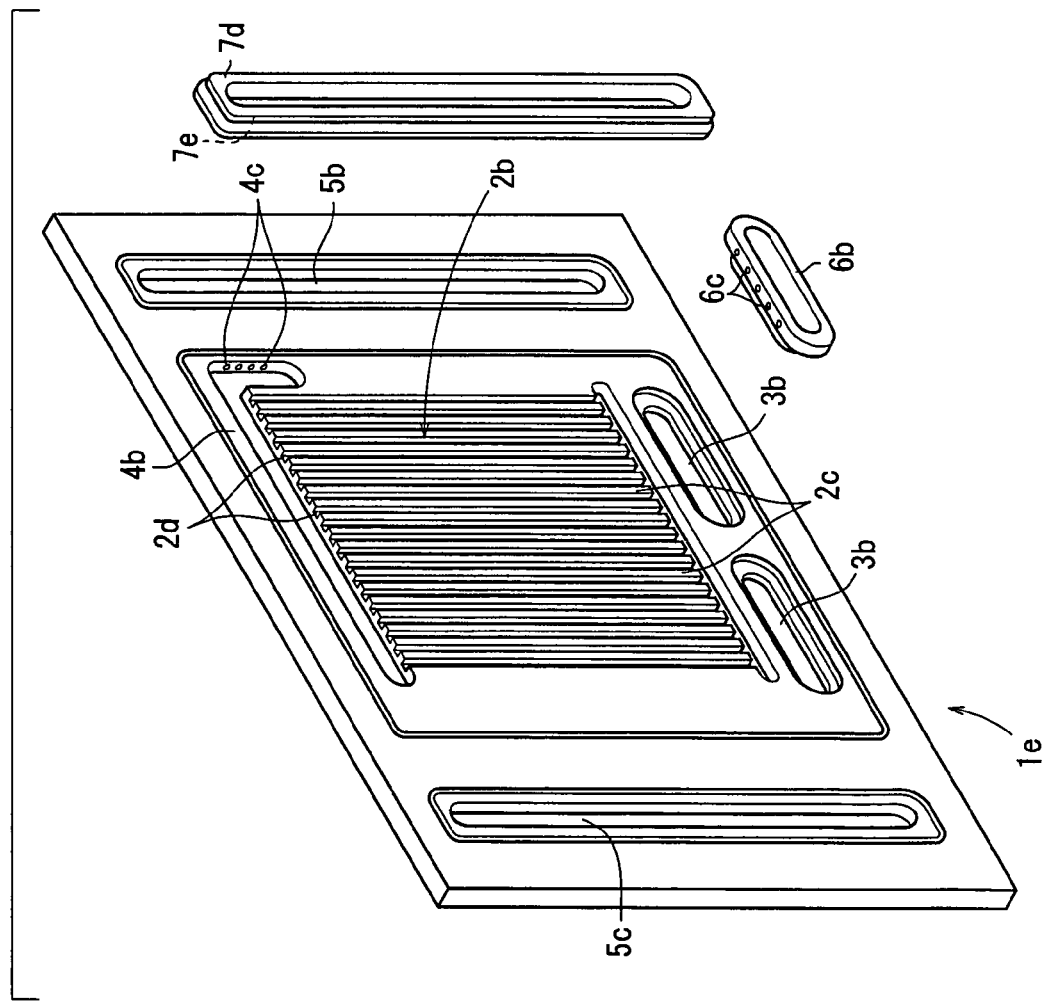

FUEL CELL STACK COMPRISING CURRENT COLLECTOR PROVIDED AT LEAST AT ONE FLUID PASSAGE

BACKGROUND OF THE INVENTION

1. Field of the Invention

The present invention relates to a fuel cell stack including electrolyte electrode assemblies and separators stacked alternately in a stacking direction. Each of the electrolyte electrode assemblies includes a pair of electrodes and an electrolyte interposed between the electrodes. Fluid passages extend through the fuel cell stack in the stacking direction, and at least one of a coolant and reactant gases flows through the fluid passages.

2. Description of the Related Art

For example, a solid polymer electrolyte fuel cell employs a membrane electrode assembly (MEA) which includes two electrodes (anode and cathode), and an electrolyte membrane (electrolyte) interposed between the electrodes. The electrolyte membrane is a polymer ion exchange membrane. The membrane electrode assembly is interposed between a pair of separators. The membrane electrode assembly and the separators make up a power generation cell for generating electricity. In use, a predetermined number of the power generation cells are stacked together. Further, terminal plates, insulating plates, and end plates are provided at opposite ends in the stacking direction to form a fuel cell stack.

In the fuel cell, a fuel gas such as a gas chiefly containing hydrogen (hereinafter also referred to as the "hydrogen-containing gas") is supplied to the anode. A gas chiefly containing oxygen or the air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In the fuel cell, a fuel gas flow field for supplying the fuel gas to the anode, and an oxygen-containing gas flow field for supplying the oxygen-containing gas to the cathode are provided in the surfaces of the separators. Further, a coolant flow field is provided between the separators for allowing the coolant to flow along the surfaces of the separators.

In general, in the so-called internal manifold type fuel cell, fluid supply passages and fluid discharge passages extend through the separators in the stacking direction. The fluids, i.e., the fuel gas, the oxygen-containing gas, and the coolant are supplied to the fuel gas flow field, the oxygen-containing gas flow field, and the coolant flow field through the respective fluid supply passages, and discharged from the fuel gas flow field, the oxygen-containing gas flow field, and the coolant flow field through the respective fluid discharge passages.

In the internal manifold type fuel cell, the terminal plates or the end plates also have the fluid supply passages and the fluid discharge passages as necessary. In this case, metal plates (metal components) such as the metal separators or the terminal plates contact the water produced in the reaction or the coolant water. Therefore, corrosion current flows through the metal plates easily, and electrical corrosion occurs in the metal plates undesirably.

In an attempt addressing the problem, for example, Japanese Laid-Open patent Publication No. 2002-124292 discloses a fuel cell stack as shown in FIG. 37. A terminal plate 3 is interposed between a separator 1 and an insulating plate 2. The fluid passage 4 extends through the separator 1, the terminal plate 3, and the insulating plate 2 in the stacking direction, and a stopper 5 is provided in the inner circumference of the terminal plate 3, around the entire circumference of the fluid passage 4.

An insulating grommet 6 is attached to the terminal plate 3. The insulating grommet 6 has an engagement portion 7 attached to the stopper 5. Further, the insulating grommet 6 has seal lips 8 at positions where the insulating grommet 6 contacts the adjacent separator 1 and the adjacent insulating plate 2.

In Japanese Laid-Open Patent Application No. 2002-124292, the grommet 6 having a complicated shape is used as an insulating structure, and the stopper 5 is formed in the inner circumference of the terminal plate 3. Thus, it is not possible to provide the insulating structure economically. In particular, if a large number of the insulating structures are provided in the fuel cell stack, the production cost of the fuel cell stack is considerably high.

Further, for example, Japanese Laid-Open Patent Publication No. 2001-155761 discloses a structure for cooling fuel cells as shown FIG. 38. In the cooling structure, four fuel cell stacks 1a through 1d are connected in series. The cooling structure includes a supply member 2a for supplying a coolant to a coolant flow field (not shown) in each of the fuel cell stacks 1a through 1d.

The supply member 2a includes an inlet pipe 3a as an inlet of the coolant, and an outlet pipe 4a as an outlet of the coolant. Mesh members 5a, 6a, made of electrically conductive material are provided at the inlet pipe 3a and the outlet pipe 4a. The mesh members 5a, 6a are electrically connected through an electrically conductive line 7a. The electrically conductive line 7a is connected to a reference electrode 8a having a potential of 0V through an electrically conductive line 7b, and connected to the ground through an electrically conductive line 7c. In this manner, the corrosion of other apparatuses connected to the cooling structure, and leakage of the electricity to the outside are prevented.

In Japanese Laid-Open Patent Publication No. 2001-155761, each of the fuel cell stacks 1a through 1d includes a plurality of cells connected in series. Thus, in particular, the corrosion current flows easily on the high potential side through metal components such as the metal separators. Thus, electrical corrosion occurs in the metal components.

Further, U.S. Pat. No. 4,371,433 discloses grommets or the like as insulators. Specifically, as shown in FIG. 39, a separator 1e has a chamber 2b at its central position. A plurality of projections 2c are provided in the chamber 2b to form a plurality of flow passages 2d extending vertically. Inlet manifolds 3b are provided at the lower end of the flow passages 2d, and a channel 4b is formed at the upper end of the flow passages 2d. An outlet manifold 5b extending vertically is connected to one end of the channel 4b. Further, the separator 1e has an outlet manifold 5c. The outlet manifold 5c extends vertically as same as the outlet manifold 5b.

An insulating liner 6b is provided at each of the inlet manifolds 3b, and an insulating grommet 7d is attached to each of the outlet manifolds 5b, 5c. Passages 6c connected to the flow passages 2d are formed in the insulating liner 6b, and the insulating grommet 7d has an opening 7e connected to openings 4c.

In this case of U.S. Pat. No. 4,371,433, when the power generation cells are stacked substantially horizontally, the water produced in the reaction or the condensed water is likely to stay at the inner bottoms of the inlet manifolds 3b and the outlet manifold 5b (hereinafter, simply referred to as the "fluid passages"). In the water, ions are eluded from components such as the membrane electrode assemblies and the seals, and the electrical conductivity is increased. Thus, in the fuel cell stack formed by a plurality of fuel cells, since the voltage is applied between the metal separators during power generation, the short circuit occurs easily between exposed metal portions of the metal separators through the water which stays in the fluid passage.

Since the liquid resistance between the exposed metal portion of the metal separator and the fluid passage is the lowest in the region, the most of the corrosion current flows through the exposed metal portion. Thus, the corrosion of the metal separator progresses, and elusion of the metal ions causes reduction in the number of ions exchanged through the solid polymer electrolyte membrane. As a result, the power generation performance may be lowered undesirably, and the degradation of the solid polymer electrolyte membrane itself occurs.

SUMMARY OF THE INVENTION

A general object of the present invention is to provide a fuel cell stack having a simple and economical structure in which it is possible to reliably prevent electrical corrosion in metal components.

Further, a main object of the present invention is to provide a fuel cell stack having a simple and economical structure in which it is possible to reliably prevent electrical corrosion in metal separators.

The present invention relates to a fuel cell stack comprising electrolyte electrode assemblies and separators stacked alternately in a stacking direction. Each of the electrolyte electrode assemblies includes a pair of electrodes, and an electrolyte interposed between the electrodes. Fluid passages extend through the fuel cell stack in the stacking direction such that fluids including at least one of a coolant and reactant gases flows through the fluid passages.

Preferably, a current collector is provided at least at one of the fluid passages, and the current collector contacts the fluid flowing through the fluid passage for collecting electricity.

Preferably, the current collector is provided at least on the high potential side of a stack body formed by stacking the electrolyte electrode assemblies and the separators alternately. In the structure, it is possible to suitably reduce the corrosion current on the high potential side.

Further, preferably, the current collector comprises an electrically conductive plate member, an electrically conductive mesh member, an electrically conductive fin member, or an electrically conductive rod member. If terminal plates are provided at opposite ends in the stacking direction, insulating plates are provided outside the terminal plates, and end plates are provided outside the insulating plates, preferably, the current collector is provided at any one of the terminal plates, the end plates, and the separators. The current collector may be provided integrally or separately at the position of the fluid passage.

Preferably, the insulating plate has a recess accommodating the terminal plate at a position inside the fluid passage where the current collector is provided, and the current collector is electrically connected to the terminal plate through a connection terminal.

Further, preferably, the separator comprises a metal plate, and a seal member is provided to cover an inner wall of the fluid passage, and the current collector is a metal surface portion of the separator which is provided at the fluid passage and formed by cutting the seal member partially.

Further, preferably, the separator comprises a metal plate, and a seal member is provided to cover an inner wall of the fluid passage, and the current collector is a metal member jointed to a metal surface portion of the metal plate such that the current collector is positioned at the fluid passage. Preferably, the current collector has a rust prevention structure.

Further, preferably, the separator comprises a metal plate, and a seal member is provided to cover an inner wall of the fluid passage, and the current collector is provided in a region including the metal surface portion of the metal plate and part of the seal member. Preferably, the current collector comprises an electrically conductive film, or is made of electrically conductive adhesive or electrically conductive coating material.

Further, according to another aspect of the present invention, the fuel cell stack comprises a metal plate member, and the fluid passages extend through the metal plate member. The metal plate member has an electrically conductive cover member covering inner walls of the fluid passages.

Further, preferably, an insulating member is provided at a position where adjacent electrically conductive cover members contact each other. In the structure, it is possible to prevent the short circuit between the metal plate members, and the desired power generation performance can be maintained.

Further, preferably, the metal plate member comprises at least any one of the separator, a terminal plate, and an end plate. In the structure, electrical corrosion in the metal separator is prevented, and the electrical current does not flow outside the fuel cell stack from the terminal plate or the end plate. Thus, the insulation performance is maintained.

In the present invention, the current collector directly contacts the fluid flowing through the fluid passage. Thus, it is possible to force the electrical current to flow through the water generated in the reaction or the coolant toward the current collector. Thus, it is possible to effectively reduce the corrosion current. With the simple and economical structure, electrical corrosion in metal components such as the separator and the terminal plate is inhibited reliably.

In the present invention, the electrically conductive cover member is provided to cover the inner wall of the fluid passage. The electrically conductive cover member is provided near the fluid passage in comparison with the exposed metal portion of the metal plate member. Therefore, the electrical current flows preferentially to the electrically conductive cover member which is the nearest electrically conductive portion from the fluid passage. Therefore, it is possible to prevent the corrosion current from flowing through the metal plate member.

Thus, with the simple and economical structure, it is possible to reliably inhibit electrical corrosion in the metal plate member. Further, it is possible to prevent the degradation in the power generation performance of the electrolyte due to elusion of metal ions, and degradation of the electrolyte itself.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 23 is a cross sectional view showing part of a fuel cell stack according to an ninth embodiment of the present invention;

FIG. 35 is a cross sectional view showing part of a fuel cell stack according to a sixteenth embodiment of the present invention;

FIG. 36 is a cross sectional view showing part of a fuel cell stack according to a seventeenth embodiment of the present invention;

FIG. 39 is a perspective view showing part a separator disclosed in U.S. Pat. No. 4,371,433.

DESCRIPTION OF THE PREFERRED EMBODIMENTS

Figure 1:
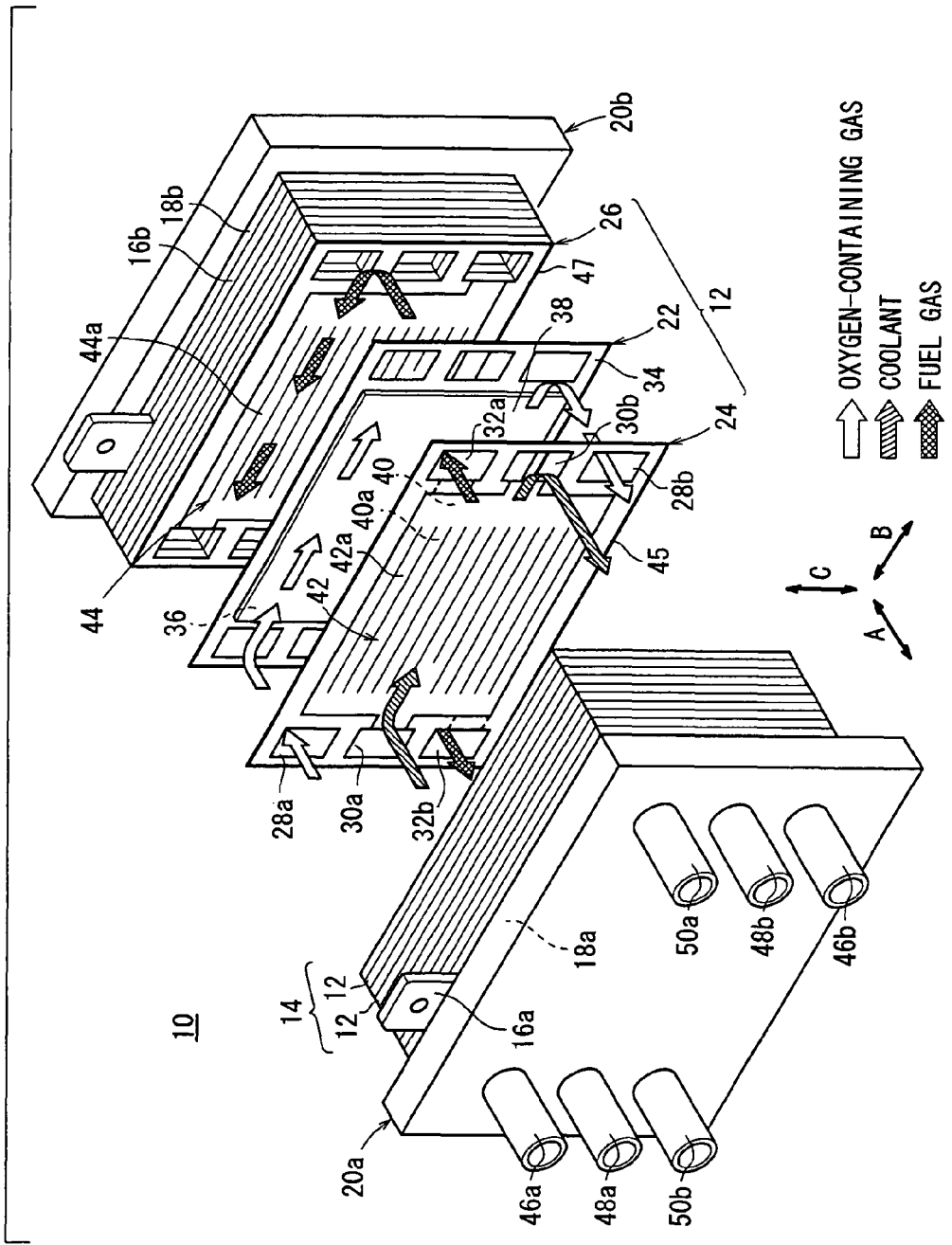
FIG. 1 is an exploded perspective view showing part of a fuel cell stack according to a first embodiment of the present invention.

FIG. 1 is an exploded perspective view showing part of a fuel cell stack 10 according to a first embodiment of the present invention.

For example, the fuel cell stack 10 is mounted on a vehicle such as an automobile. The fuel cell stack 10 includes a stack body 14 formed by stacking a plurality of power generation cells 12 in a stacking direction indicated by an arrow A. At opposite ends of the stack body 14 in the stacking direction, terminal plates 16a, 16b are provided. Insulating plates 18a, 18b are provided outside the terminal plates 16a, 16b. Further, end plates 20a, 20b are provided outside the insulating plates 18a, 18b. The end plates 20a, 20b are tightened together in the stacking direction using tightening bolts (not shown).

Figure 2:
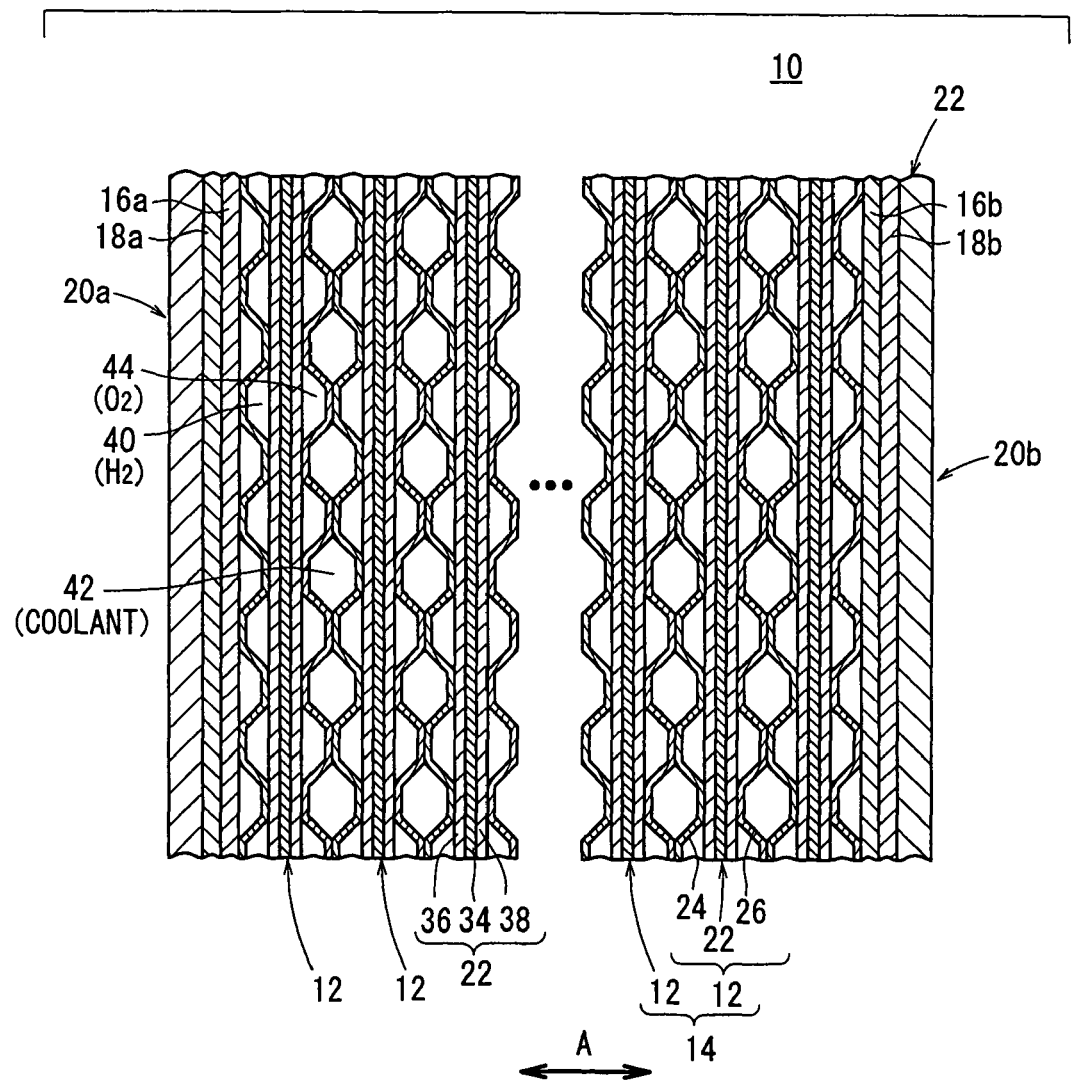
FIG. 2 is a cross sectional side view showing part of the fuel cell stack.

As shown in FIGS. 1 and 2, each of the power generation cells 12 includes a membrane electrode assembly (electrolyte electrode assembly) 22 and first and second metal separators 24, 26 sandwiching the membrane electrode assembly 22. The first and second metal separators 24, 26 are corrugated thin plates. Instead of using the first and second metal separators 24, 26, for example, carbon separators may be used.

As shown in FIG. 1, at one end of the power generation cells 12 in a direction indicated by an arrow B, an oxygen-containing gas supply passage 28a for supplying an oxygen-containing gas such as the air, a coolant supply passage 30a for supplying a coolant such as pure water or ethylene glycol, and a fuel gas discharge passage 32b for discharging a fuel gas such as a hydrogen-containing gas are provided. The oxygen-containing gas supply passage 28a, the coolant supply passage 30a, and the fuel gas discharge passage 32b extend through the power generation cells 12 in the direction indicated by the arrow A.

At the other end of the power generation cells 12 in the direction indicated by the arrow B, a fuel gas supply passage 32a for supplying the fuel gas, a coolant discharge passage 30b for discharging the coolant, and an oxygen-containing gas discharge passage 28b for discharging the oxygen-containing gas are provided. The fuel gas supply passage 32a, the coolant discharge passage 30b, and the oxygen-containing gas discharge passage 28b extend through the power generation cells 12 in the direction indicated by the arrow A.

The membrane electrode assembly 22 includes an anode 36, a cathode 38, and a solid polymer electrolyte membrane 34 interposed between the anode 36 and the cathode 38. The solid polymer electrolyte membrane 34 is formed by impregnating a thin membrane of perfluorosulfonic acid with water, for example.

Each of the anode 36 and cathode 38 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 36 and the electrode catalyst layer of the cathode 38 are fixed to both surfaces of the solid polymer electrolyte membrane 34, respectively.

The first metal separator 24 has an oxygen-containing gas flow field 40 on a surface facing the membrane electrode assembly 22. The oxygen-containing gas flow field 40 is connected between the oxygen-containing gas supply passage 28a and the oxygen-containing gas discharge passage 28b. The first metal separator 24 has a coolant flow field 42 on the other surface opposite to the membrane electrode assembly 22. The coolant flow field 42 is connected between the coolant supply passage 30a and the coolant discharge passage 30b.

The second metal separator 26 has a fuel gas flow field 44 on a surface facing the membrane electrode assembly 22. The fuel gas flow field 44 is connected between the fuel gas supply passage 32a and the fuel gas discharge passage 32b. The other surface of the second metal separator 26 is stacked on the first metal separator 24. The coolant flow field 42 is formed between the surfaces of the first metal separator 24 and the second metal separator 26.

For example, the oxygen-containing gas flow field 40 includes a plurality of grooves 40a extending in the direction indicated by the arrow B, the coolant flow field 42 includes a plurality of grooves 42a extending in the direction indicated by the arrow B, and the fuel gas flow field 44 includes a plurality of grooves 44a extending in the direction indicated by the arrow B. A first seal member 45 is formed integrally on the outer marginal surfaces of the first metal separator 24, and a second seal member 47 is formed integrally on the outer marginal surfaces of the second metal separator 26.

Figure 3:
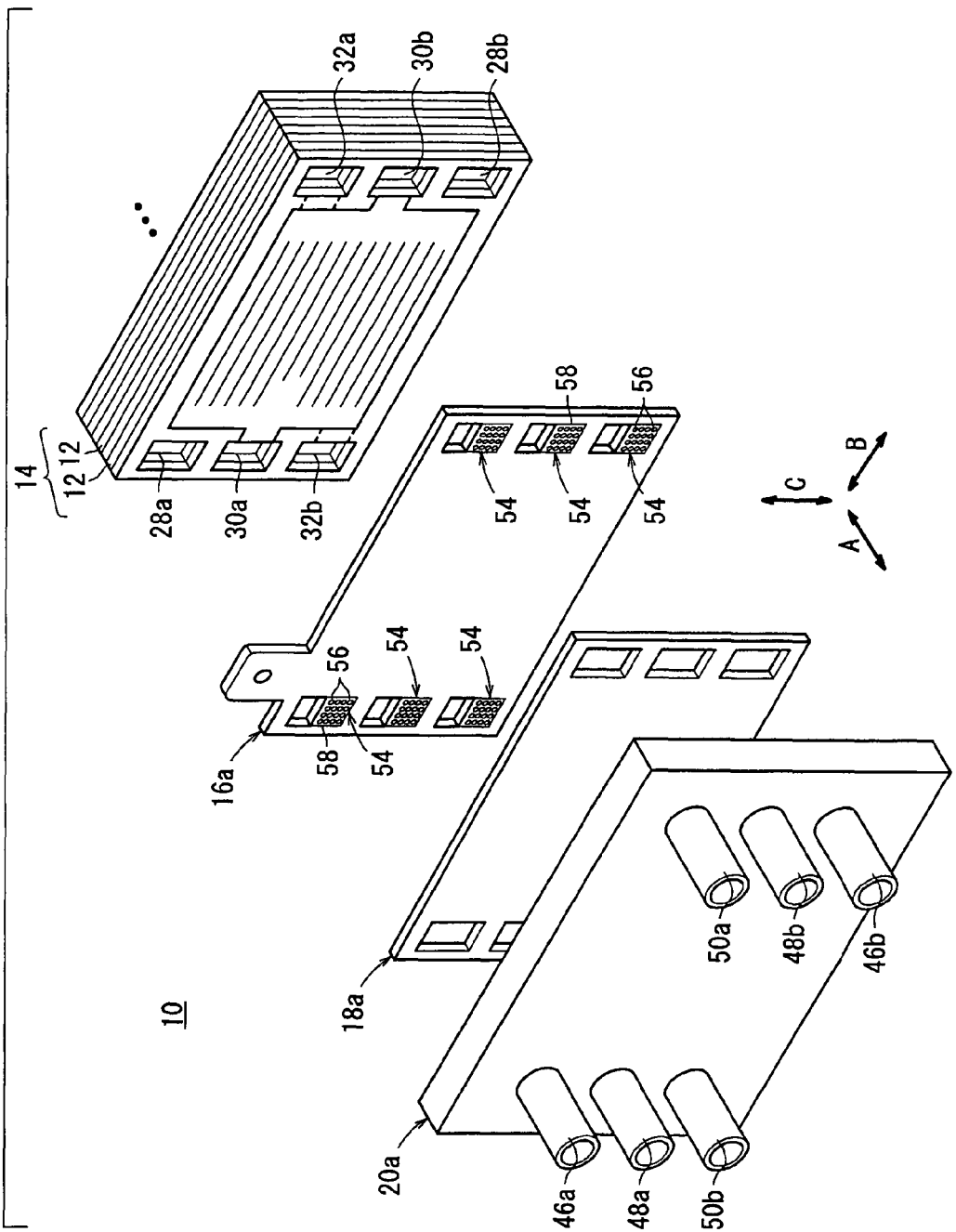
FIG. 3 is a perspective view showing a state in which a terminal plate, an insulating plate, and an end plate of the fuel cell stack are separated.

As shown in FIGS. 1 and 3, manifold pipes 46a, 48a, 50b are provided at one end of the end plate 20a in the direction indicated by the arrow B. The manifold pipes 46a, 48a, 50b are connected to the oxygen-containing gas supply passage 28a, the coolant supply passage 30a, and the fuel gas discharge passage 32b, respectively. The manifold pipes 46a, 48a, 50b may be integral with the end plate 20a. Alternatively, the manifold pipes 46a, 48a, 50b may be provided as separate components. Further, manifold pipes 50a, 48b, 46b are provided at the other end of the end plate 20a in the direction indicated by the arrow B. The manifold pipes 50a, 48b, 46b are connected to the fuel gas supply passage 32a, the coolant discharge passage 30b, and the oxygen-containing gas discharge passage 28b, respectively. The manifold pipes 50a, 48b, 46b may be integral with the end plate 20a. Alternatively, the manifold pipes 50a, 48b, 46b may be provided as separate components.

Figure 4:
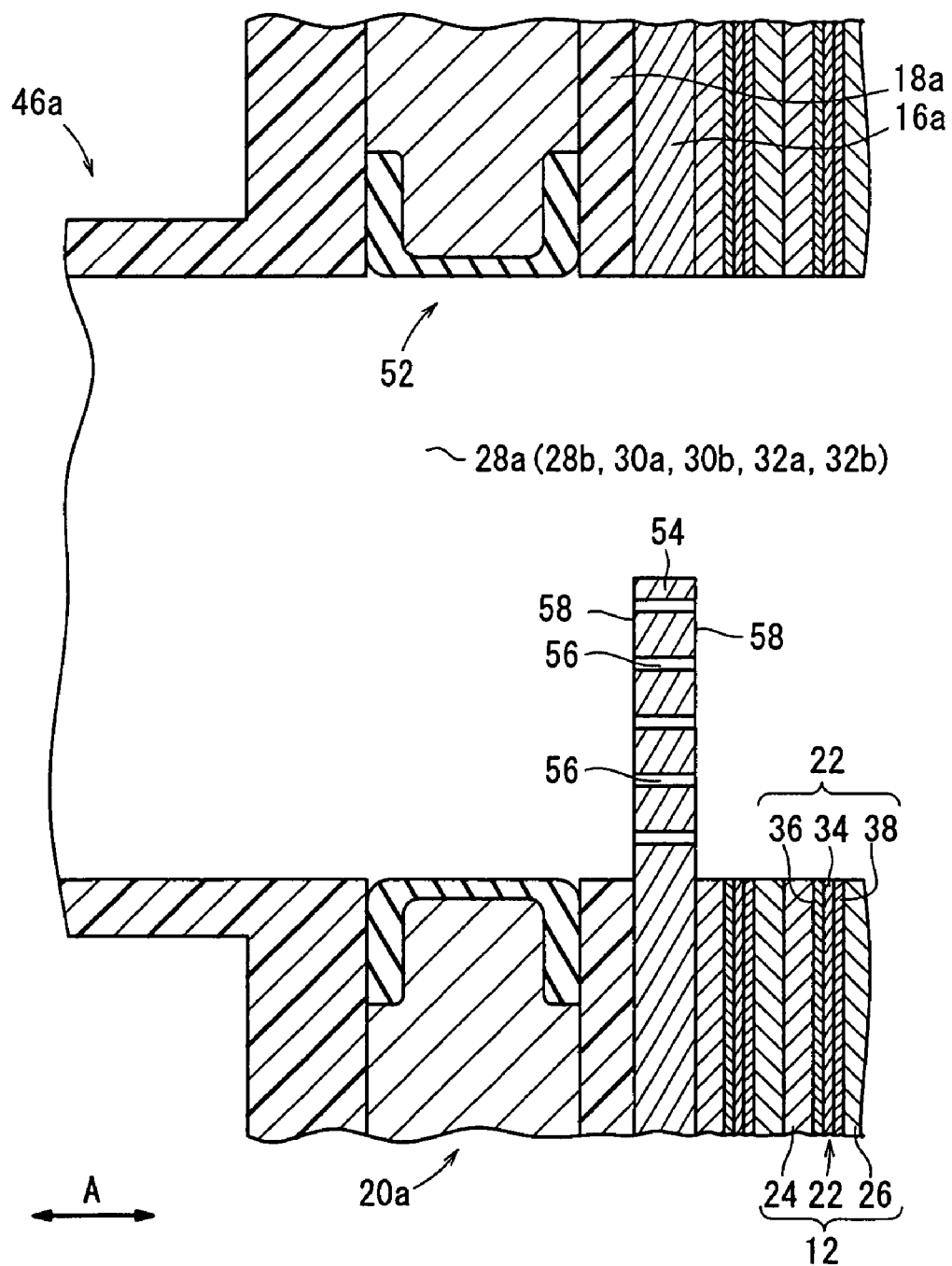
FIG. 4 is a cross sectional view showing part of the fuel cell stack.

As shown in FIG. 4, insulating grommets 52 are attached to the end plate 20a, at the respective rectangular inner surfaces of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

In FIGS. 3 and 4, the terminal plate 16a is a metal plate such as a copper plate. The terminal plate 16a has current collectors 54 provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

In the embodiment, the current collectors 54 are provided integrally with the terminal plate 16a. Alternatively, the current collectors 54 may be provided separately from the terminal plate 16a. Each of the current collectors 54 has a plurality of holes 56 for reducing the fluid resistance (pressure loss). The current collector 54 includes a gold plated portion 58 on its surface as a rust prevention structure.

The structure of terminal plate 16b is the same as the structure of the terminal plate 16a. Thus, the detailed description of the terminal plate 16b is omitted. The terminal plate 16a is provided on the high potential side (cathode side) of the stack body 14, and includes the current collectors 54 for reducing the corrosion current on the high potential side. The terminal plate 16b is provided on the low potential side (anode side) of the stack body 14, and includes the current collectors 54 for preventing the affect due to the low potential, as necessary.

Next, operation of the fuel cell stack 10 will be described.

Firstly, as shown in FIG. 1, the oxygen-containing gas is supplied from the manifold pipe 46a to the oxygen-containing gas supply passage 28a of the fuel cell stack 10. The fuel gas is supplied from the manifold pipe 50a to the fuel gas supply passage 32a of the fuel cell stack 10. Further, the coolant is supplied from the manifold pipe 48a to the coolant supply passage 30a of the fuel cell stack 10.

In the fuel cell stack 10, the oxygen-containing gas flows from the oxygen-containing supply passage 28a into the oxygen-containing gas flow field 40 of the first metal separator 24, and flows along the cathode 38 of the membrane electrode assembly 22. The fuel gas flows from the fuel gas supply passage 32a into the fuel gas flow field 44 of the second metal separator 26, and flows along the anode 36 of the membrane electrode assembly 22.

Thus, in each of the membrane electrode assemblies 22, the oxygen-containing gas supplied to the cathode 38, and the fuel gas supplied to the anode 36 are consumed in the electrochemical reactions at catalyst layers of the cathode 38 and the anode 36 for generating electricity.

The oxygen-containing gas consumed at the cathode 38 flows through the oxygen-containing gas discharge passage 28b, and is discharged into the manifold pipe 46b connected to the end plate 20a. Likewise, the fuel gas consumed at the anode 36 flows through the fuel gas discharge passage 32b, and is discharged into the manifold pipe 50b connected to the end plate 20a.

Further, the coolant such as pure water or ethylene glycol flows into the coolant flow field 42 between the first and second metal separators 24, 26, and flows in the direction indicated by the arrow B. After the coolant is used for cooling the membrane electrode assembly 22, the coolant flows through the coolant discharge passage 30b, and is discharged into the manifold pipe 48b connected to the end plate 20a. The coolant is circulated, and may be used again.

In the first embodiment, the terminal plates 16a, 16b have the current collectors 54 provided at least at lower portions of the oxygen-containing gas supply 28a, the coolant supply passage 30a, the fuel gas discharge passage 32b, the fuel gas supply passage 32a, the coolant discharge passage 30b, and the oxygen-containing gas discharge passage 28b. The current collectors 54 may be provided integrally with the terminal plates 16a, 16b. Alternately, the current collectors 54 may be provided as separate components. The current collector 54 has the holes 56. Further, the current collector 54 includes the gold plated portion 58 on its surface for preventing rust.

Thus, for example, in the oxygen-containing gas discharge passage 28b where the water is likely to be produced in the reaction, the water directly contacts the respective current collectors 54 of the terminal plates 16a, 16b. Therefore, it is possible to force the electrical current to flow through the water to the terminal plates 16a, 16b. Accordingly, in particular, since the corrosion current flows through the terminal plate 16a, the electrical corrosion in the terminal plate 16a is inhibited effectively.

Figure 5:
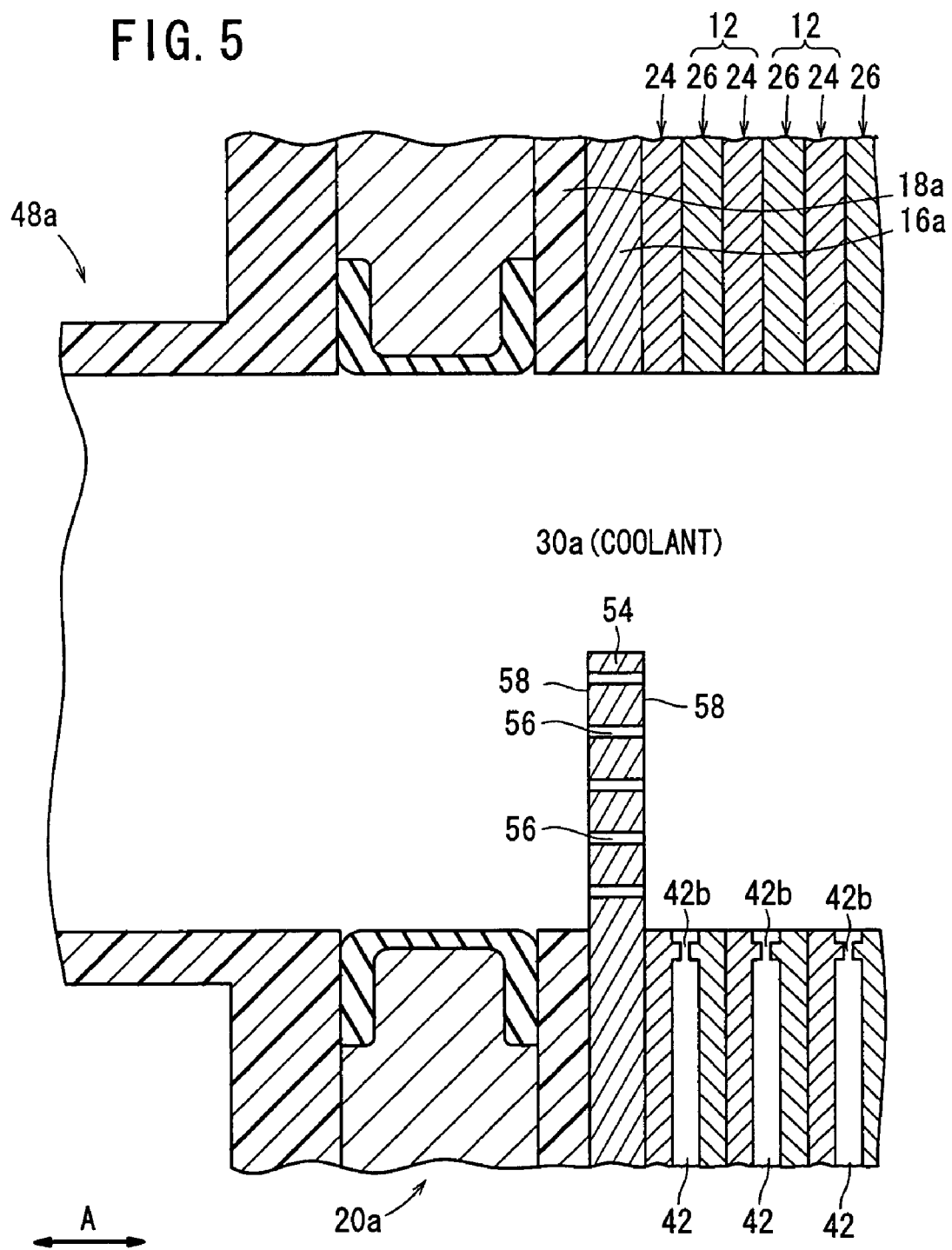
FIG. 5 is a cross sectional view taken along a coolant supply passage.
Figure 6:
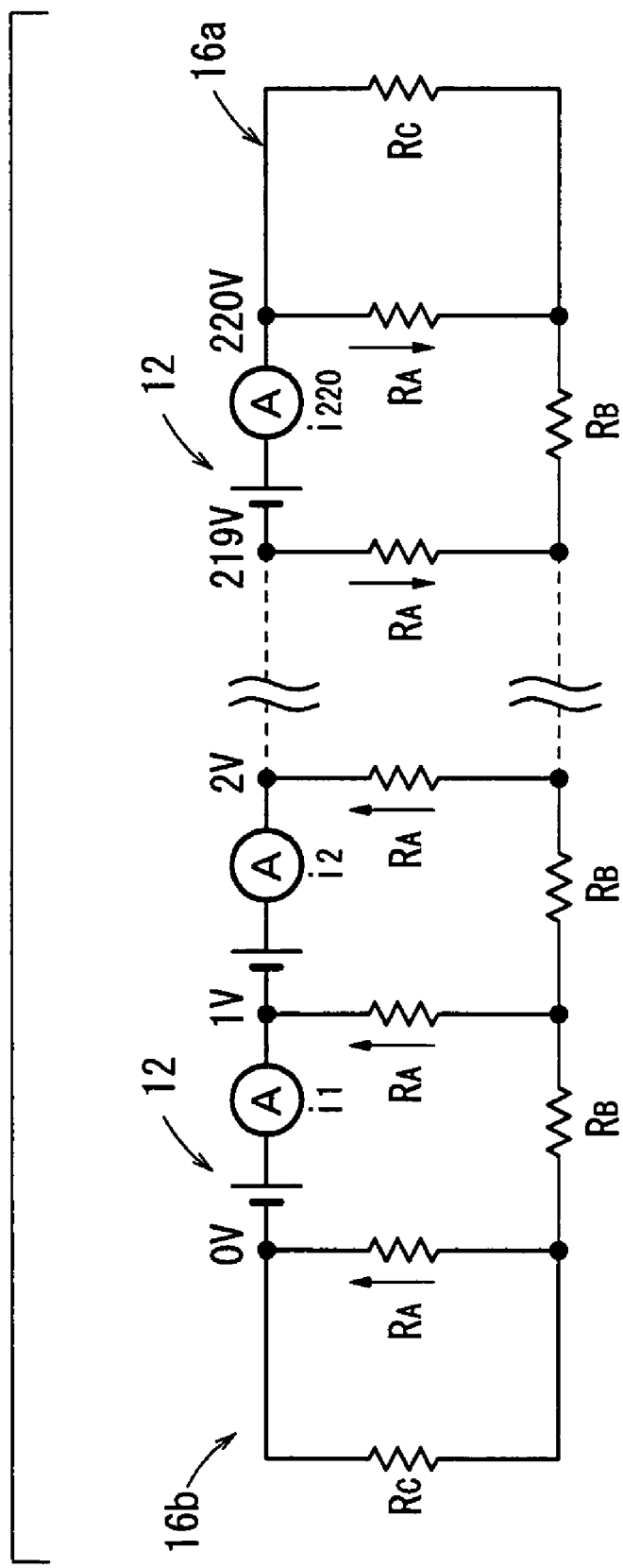
FIG. 6 is an equivalent circuit diagram of the part shown in FIG. 5.

Specific description in the case of the coolant supply passage 30a shown in FIG. 5 will be given below with reference to an equivalent circuit shown in FIG. 6.

The coolant flow field 42 formed between the power generation cells 12 is connected to the coolant supply passage 30a through an inlet (bridge) 42b. The internal surface of the coolant supply passage 30a and the internal surface of the inlet 42b are coated by insulating films. Therefore, as shown in FIG. 6, in each segment between the adjacent power generation cells 12, a liquid resistance $R_A$ of the inlet 42b is present. Further, a liquid resistance $R_B$ of the coolant supply passage 30a is present for each of the power generation cells 12.

For example, the number of the power generation cells 12 connected in series is 220, and each of the power generation cells 12 generates a voltage of 1 V. At the terminal plate 16a on the high potential side, a reaction resistance $R_C$ of the current collector 54 is generated. Likewise, at the terminal plate 16b on the low potential side, the reaction resistance $R_C$ of the current collector 54 is generated.

In this regard, a case where the current collectors 54 are provided only on the terminal plate 16a (example 1 according to the present invention), a case where the current collectors 54 are provided on both of the terminal plates 16a, 16b (example 2 according to the present invention), and a case where no current collectors 54 are provided on the terminal plates 16a, 16b (conventional example) were examined.

The example 1, the example 2, and the conventional example were used for determining the relationship between the position of the power generation cell 12 and the corrosion current flowing through each coolant flow field 42. The result is shown in FIG. 7.

Figure 7:
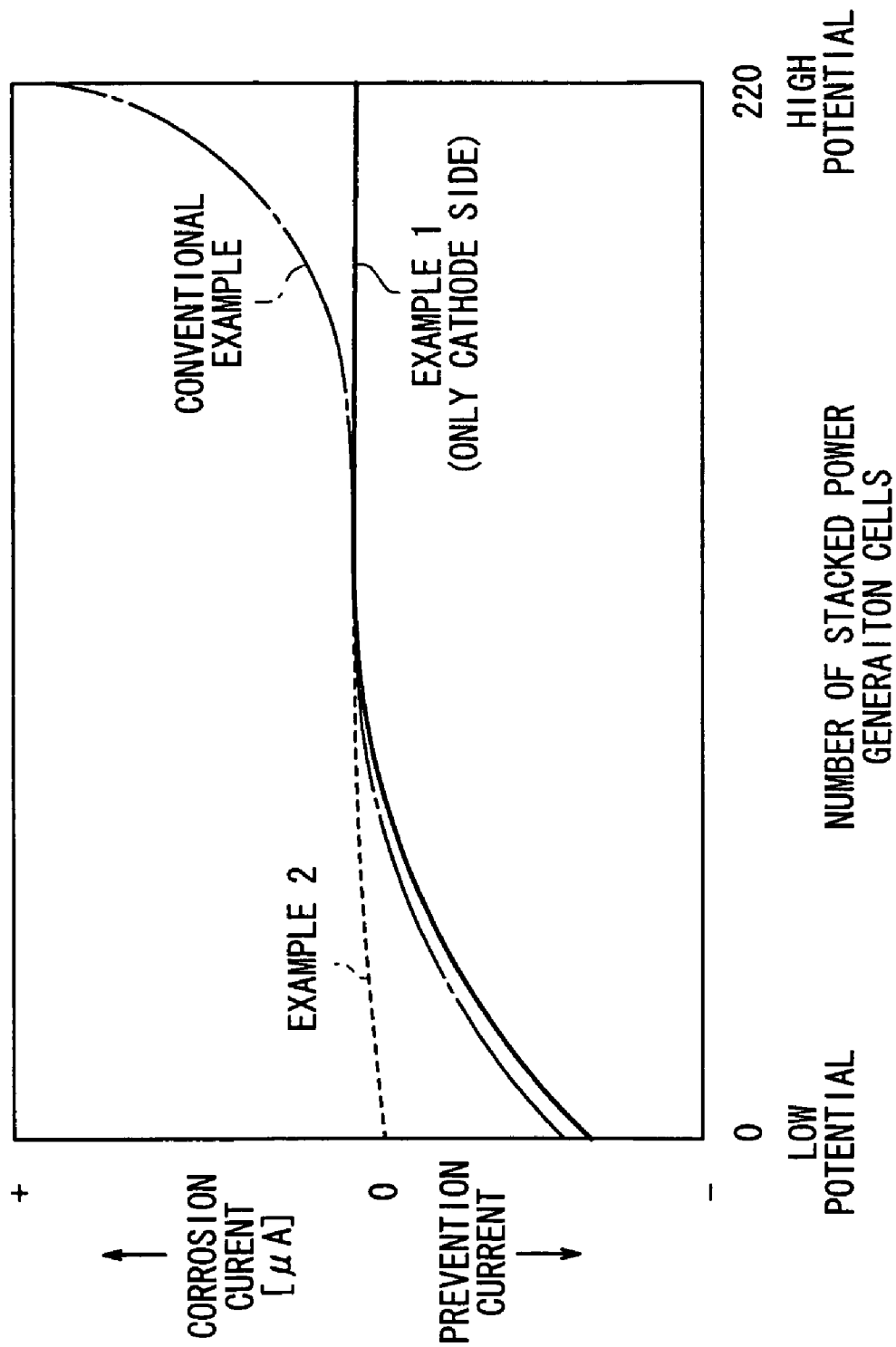
FIG. 7 is a graph showing the relationship between the number of power generation cells of the fuel cell stack and the corrosion current.

As can be seen from FIG. 7, in the conventional example, the corrosion current flowing through the coolant flow field 42 on the high potential side is considerably large. In contrast, in the example 1 and the example 2, since the current collectors 54 are provided on the high potential side, the corrosion current is forced to flow through the current collectors 54. As a result, the amount of the corrosion current flowing through the coolant flow field 42 was reduced significantly.

Therefore, in the first embodiment, with the simple and economical structure which can be achieved by providing the current collectors 54 on the terminal plate 16a on the high potential side, it is possible to reliably prevent the electrical corrosion in metal components such as the first and second separators 24, 26.

Further, the current collectors 54 are provided to cover the substantially lower half areas of the openings of the respective fluid passages, and include the holes 56. Thus, it is possible to reduce the pressure losses in the oxygen-containing gas, the fuel gas, and the coolant flowing through the respective fluid passages.

Further, in the example 2, the current collectors 54 are provided on the terminal plate 16b on the low potential side. Thus, as shown in FIG. 7, the prevention current on the low potential side is reduced significantly. Thus, the current value is approximately "0" from the low potential side to the high potential side. That is, it is possible to suitably reduce both of the corrosion current and the prevention current.

Figure 8:
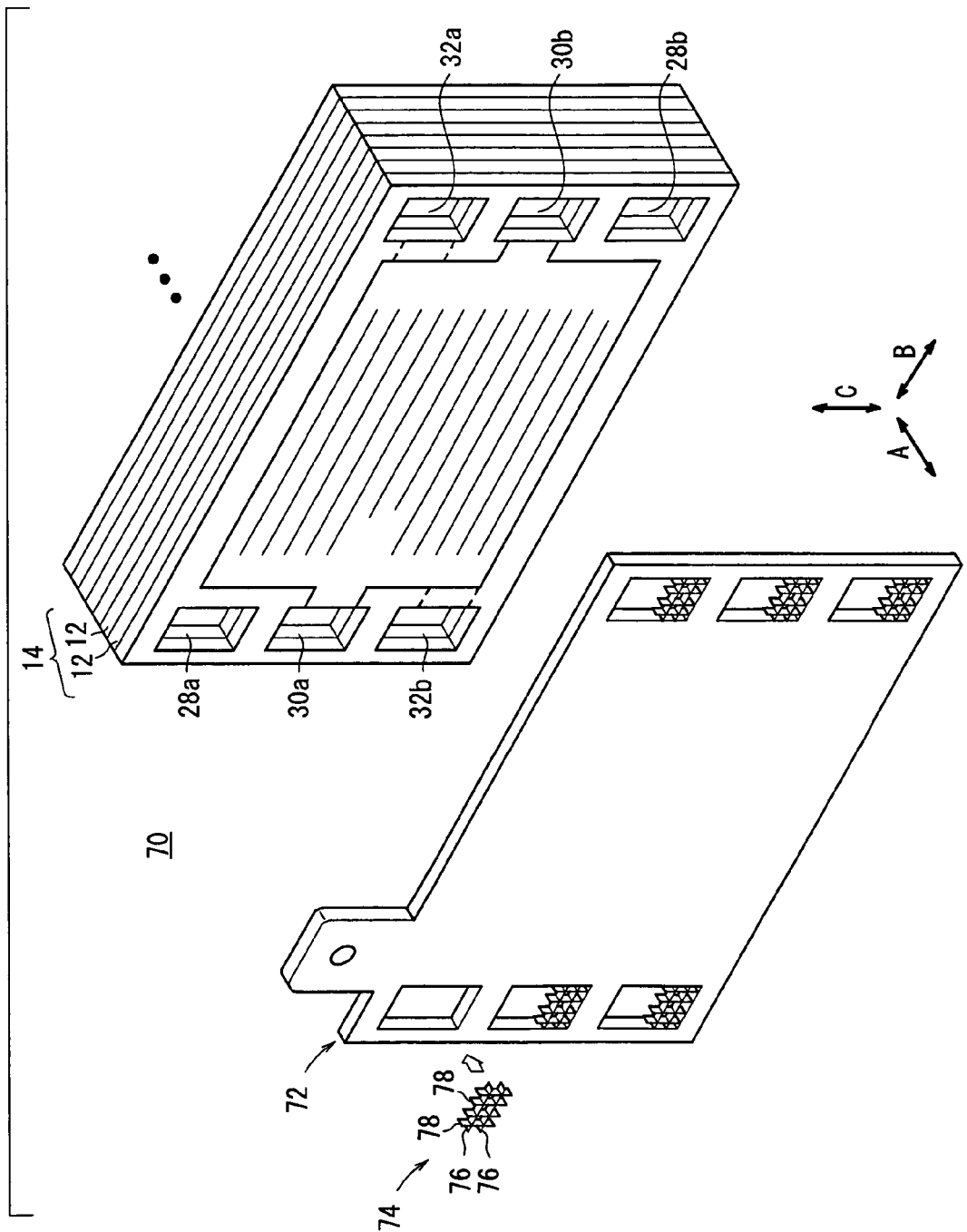
FIG. 8 is an exploded perspective view showing part of a fuel cell stack according to a second embodiment of the present invention.

FIG. 8 is an exploded perspective view showing part of a fuel cell stack 70 according to a second embodiment of the present invention. The constituent elements that are identical to those of the fuel cell stack 10 according to the first embodiment are labeled with the same reference numerals, and description thereof will be omitted. Likewise, in third through seventeenth embodiments described later, the constituent elements that are identical to those of the fuel cell stack 10 according to the first embodiment are labeled with the same reference numeral, and description thereof will be omitted.

The fuel cell stack 70 includes terminal plates 72 at opposite ends of the power generation cells 12 in the stacking direction. The terminal plate 72 has fin members (current collectors) 74 provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. The fin members 74 may be provided integrally with the terminal plate 72. Alternatively, the fin members 74 may be provided separately from the terminal plate 72.

Each of the fin members 74 includes a plurality of plate members 76 extending in the direction indicated by the arrow B and a plurality of plate members 78 extending in the direction indicated by the arrow C. The fin member 74 has a rust prevention structure. For example, the fin member 74 is made of copper material which has been subjected to gold plating treatment, platinum, carbon, or vanadium.

Each of the fin members 74 is inserted into the terminal plate 72, and sandwiched between members which are provided at opposite ends in the stacking direction.

Figure 9:
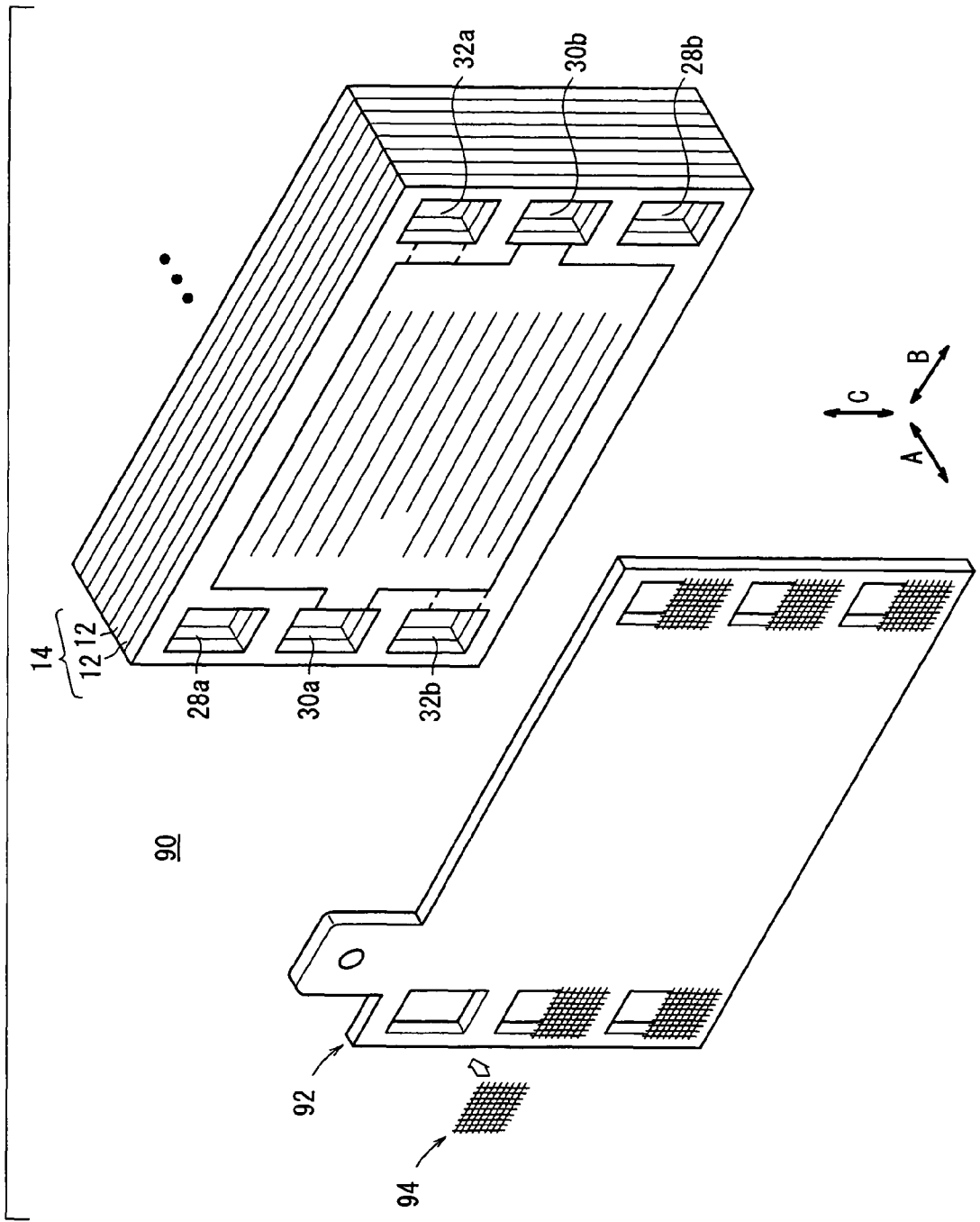
FIG. 9 is an exploded perspective view showing part of a fuel cell stack according to a third embodiment of the present invention.

FIG. 9 is an exploded perspective view showing part of a fuel cell stack 90 according to a third embodiment of the present invention.

On one surface of a terminal plate 92 of the fuel cell stack 90, mesh members (current collectors) 94 are provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

The mesh member 94 is made of material same as the material of the fin member 74. For example, the mesh member 94 is fixedly sandwiched between the terminal plate 92 and an adjacent member provided on one surface of the terminal plate 92. The mesh member 94 may be provided over the entire area of the opening of each fluid passage. Alternatively, the mesh member 94 may be provided only at the lower portion of the fluid passage.

Figure 10:
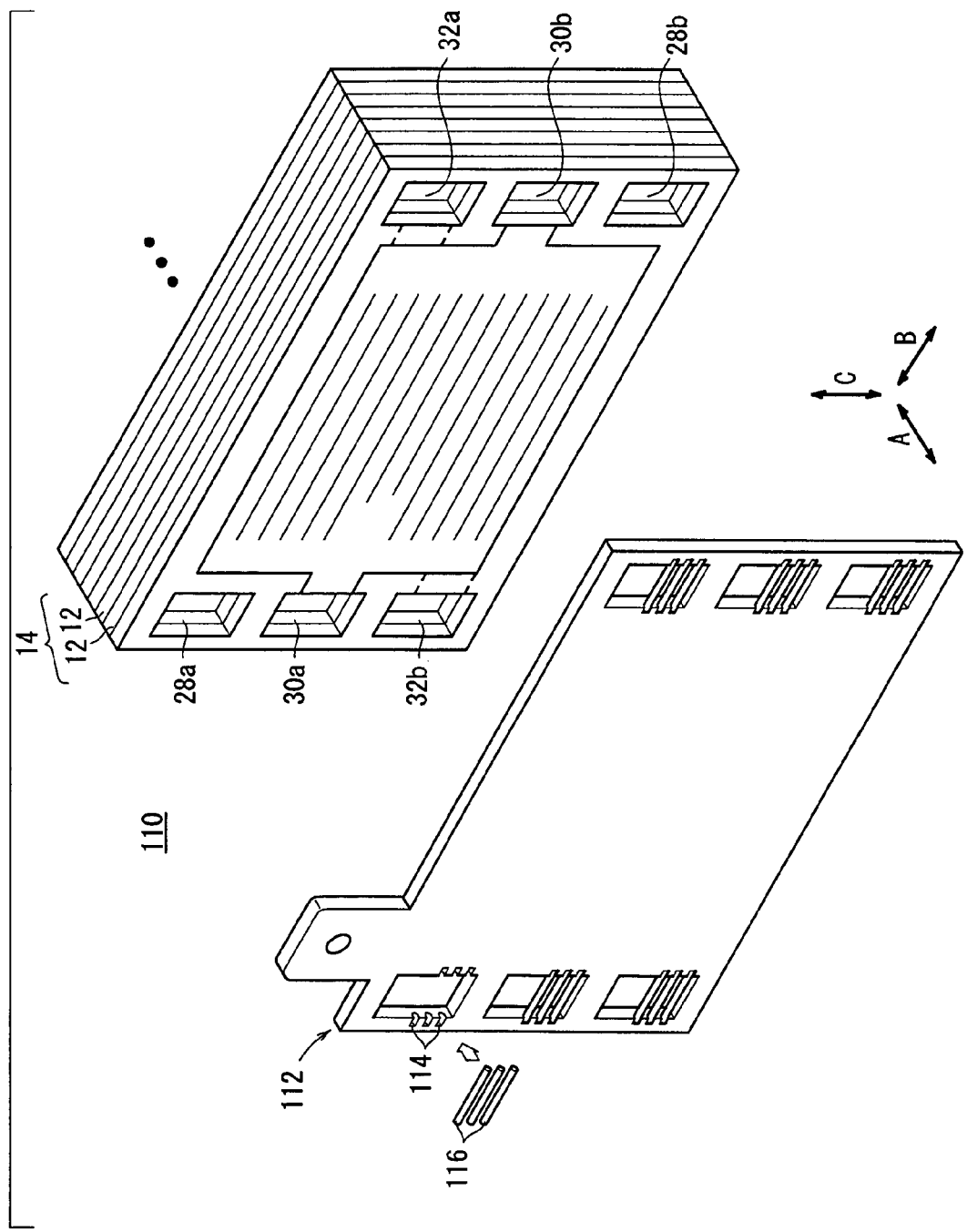
FIG. 10 is an exploded perspective view showing part of the fuel cell stack according to a fourth embodiment of the present invention.

FIG. 10 is an exploded perspective view showing part of a fuel cell stack 110 according to a fourth embodiment of the present invention.

On one surface of a terminal plate 112 of the fuel cell stack 110, a plurality of grooves 114 extend in the direction indicated by the arrow B at each of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

A rod member (current collector) 116 is placed in each of the grooves 114, and the outer circumferential surface of the rod member 116 and the one surface of the terminal plate 112 are substantially in the same plane. The rod member 116 is made of material same as the material of the fin member 74. The rod members 116 are placed in the grooves 114, and, for example, supported by an insulating plate (not shown) on the terminal plate 112.

In the second through fourth embodiments, the fin members 74, the mesh members 94, and the rod members 116 are used as the current collectors. The current collectors directly contact the water produced in the reaction or the coolant for collecting electricity. Therefore, the same advantages as with the first embodiment can be obtained. For example, it is possible to prevent the electrical corrosion in the terminal plates 72, 92, and 112.

Figure 11:
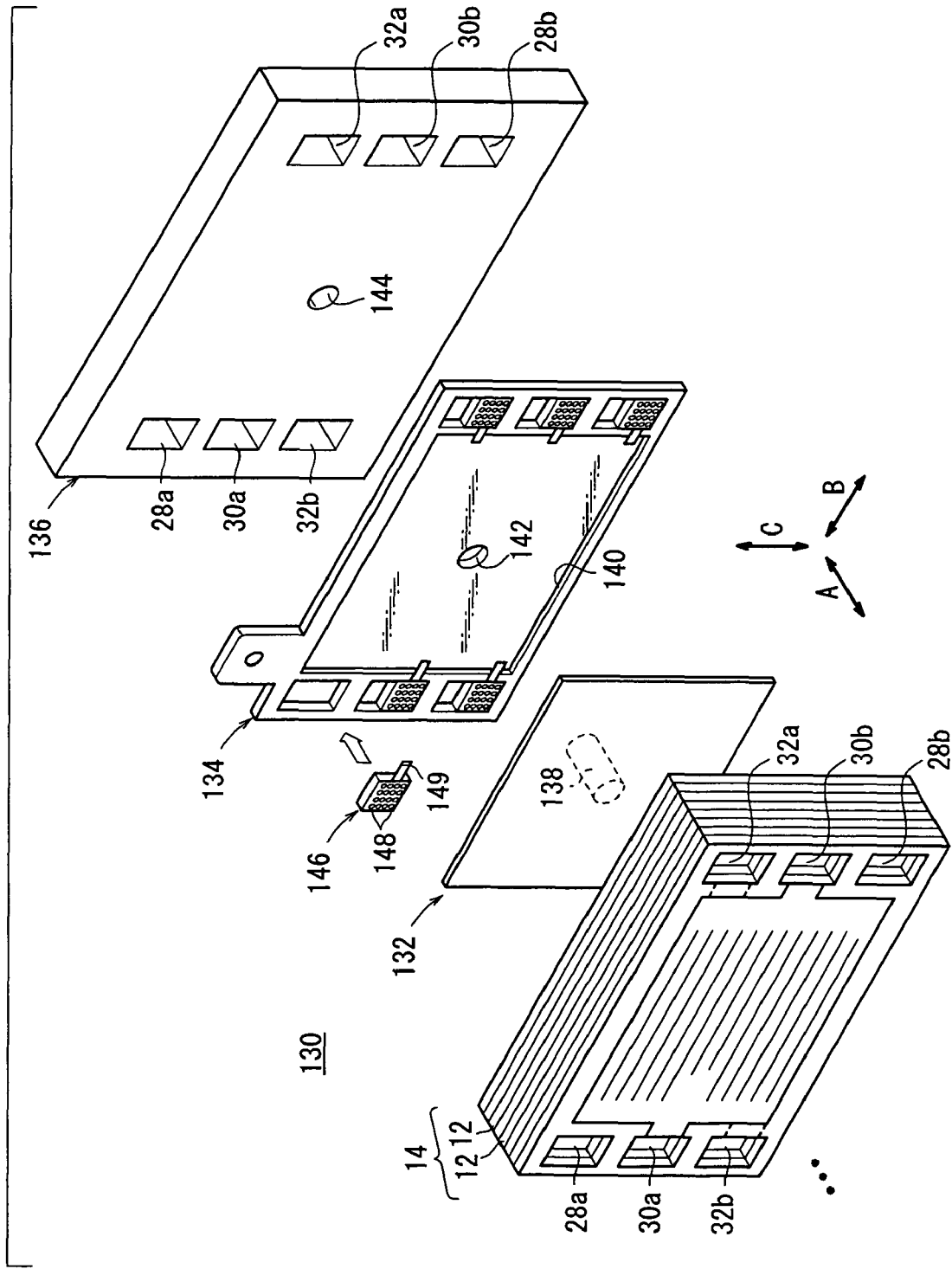
FIG. 11 is an exploded perspective view showing part of the fuel cell stack according to a fifth embodiment of the present invention.

FIG. 11 is an exploded perspective view showing part of a fuel cell stack 130 according to a fifth embodiment of the present invention.

The fuel cell stack 130 includes terminal plates 132, insulating plates 134, and end plates 136 provided at opposite ends of the stack body 14 in the direction indicated by the arrow A. A terminal 138 is provided at substantially the central position of the terminal plate 132.

The insulating plate 134 has a frame shape, including a recess 140 for accommodating the terminal plate 132. A hole 142 is formed at substantially the central position of the recess 140. The terminal plate 132 is placed in the recess 140. The terminal 138 is inserted into both of the hole 142 and a hole 144 of the end plate 136.

The insulating plate 134 has plate-shaped current collecting members (current collectors) 146 provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

Figure 12:
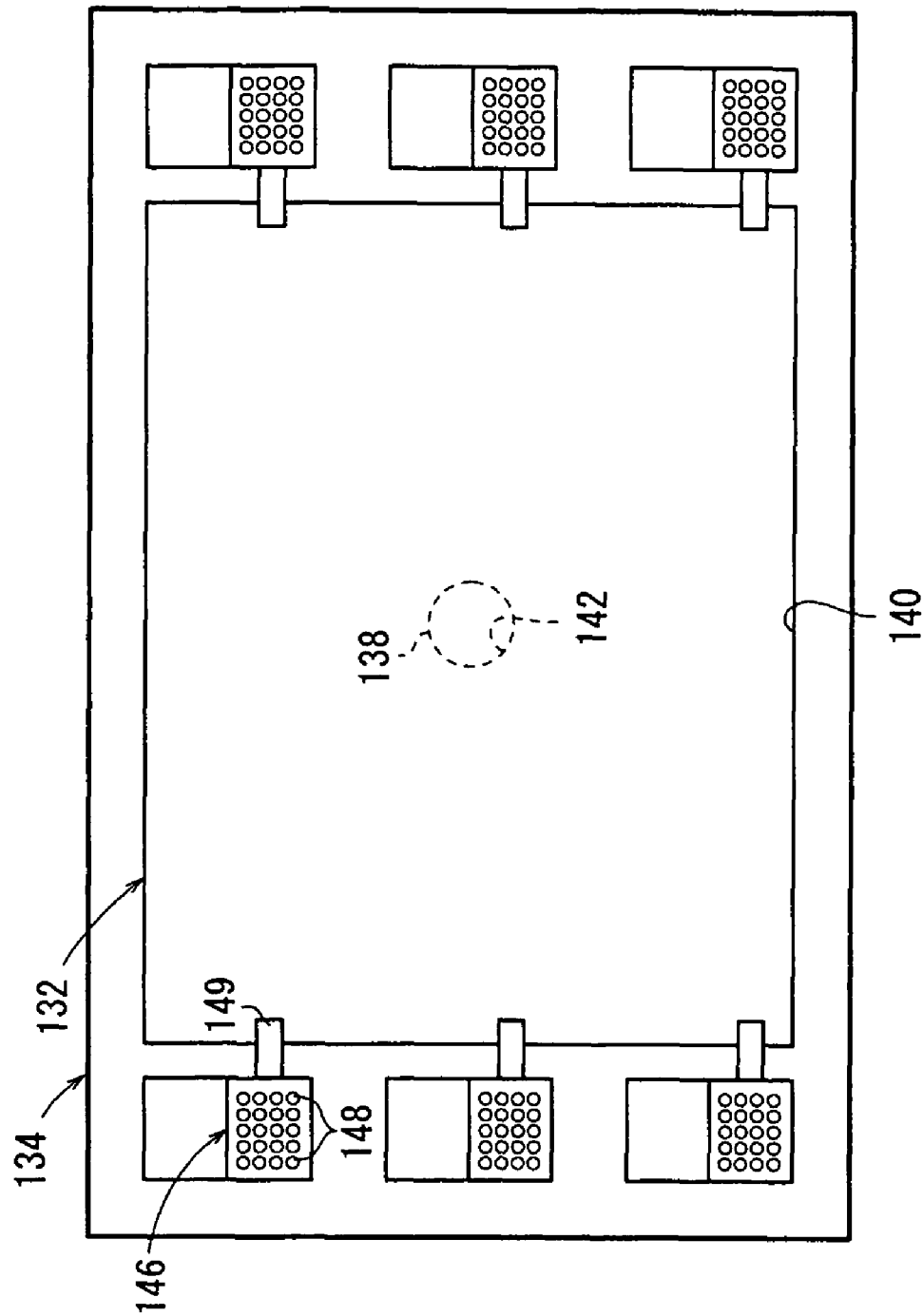
FIG. 12 is a front view showing a terminal plate and an insulating plate of the fuel cell stack.

For example, the plate-shaped current collecting member 146 is made of material which has been subjected to gold plating treatment, platinum, carbon, or vanadium, and includes a plurality of holes 148. The structure of the plate-shaped current collecting member 146 is substantially the same as the structure of the current collector 54. As shown in FIGS. 11 and 12, each of the plate-shaped current collecting members 146 is electrically connected to the terminal plate 132 through a connection terminal 149.

In the fifth embodiment, the water produced in the reaction and the coolant directly contact the plate-shaped current collecting member 146, and the current collecting member 146 is electrically connected to the terminal plate 132 through the connection terminal 149. Therefore, it is possible to force the electrical current to flow from the water generated in the reaction and the coolant to the terminal plate 132.

Thus, the same advantages as with the first through fourth embodiments can be obtained. For example, the flow of the corrosion current through metal components of the fuel cell stack 130 is inhibited effectively, and it is possible to reliably prevent the electrical corrosion. Further, since the metal terminal plate 132 is provided as a separate component from the manifolds, the size of the metal terminal plate 132 is small. Thus, reduction of the weight can be achieved easily.

Figure 13:
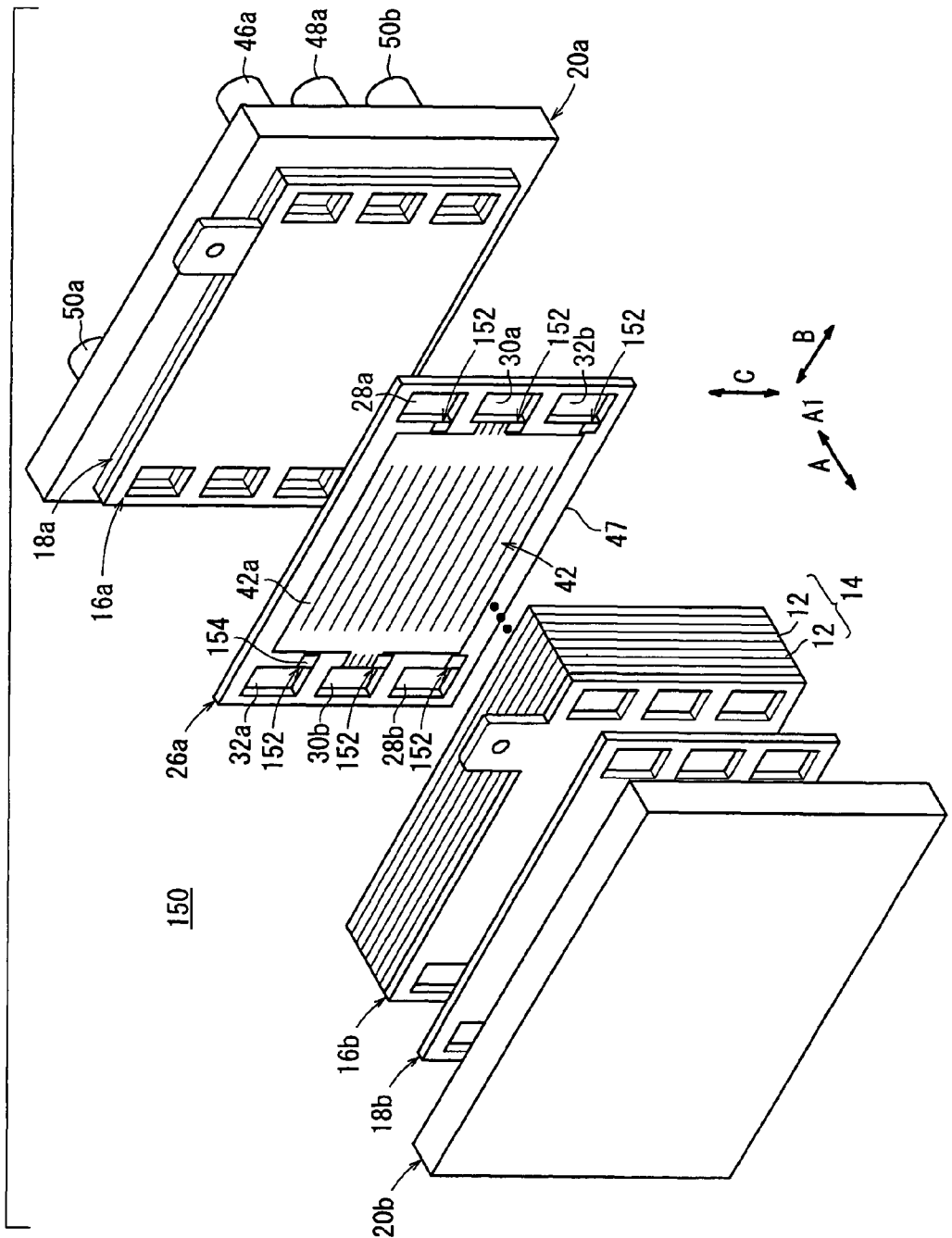
FIG. 13 is a perspective view in which an end separator of a fuel cell stack according to a sixth embodiment of the present invention is separated.

FIG. 13 is an exploded perspective view showing part of a fuel cell stack 150 according to a sixth embodiment of the present invention.

The stack body 14 of the fuel cell stack 150 includes an end separator (second metal separator) 26a stacked on a terminal plat 16a on the high potential side (on the front side in a direction indicated by an arrow A1).

The end separator 26a has current collectors 152 provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. The current collectors 152 reduce the corrosion current on the high potential side.

Figure 14:
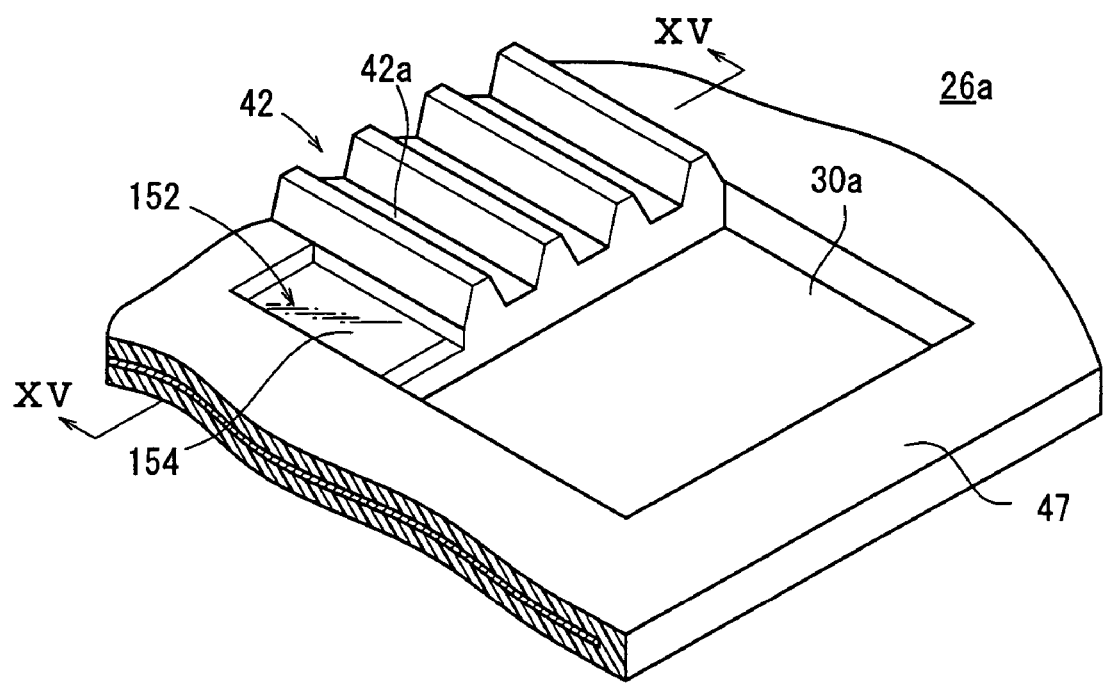
FIG. 14 is an enlarged perspective view showing part of the end separator.
Figure 15:
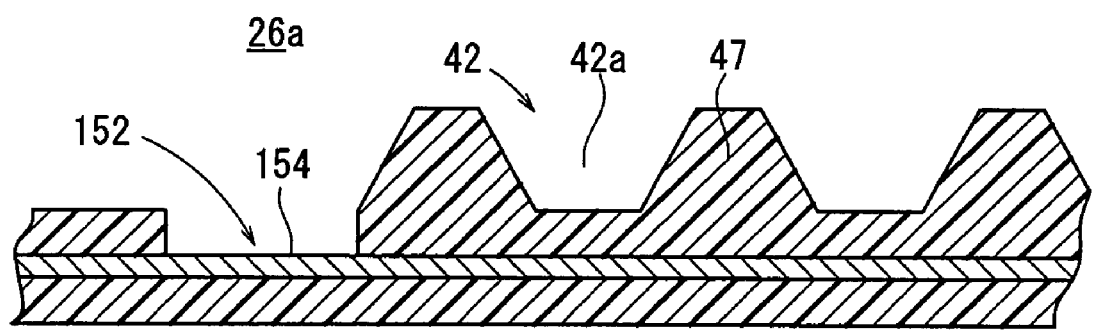
FIG. 15 is a cross sectional view showing the end separator taken along a line XV-XV in FIG. 14.

The current collectors 152 are provided integrally with the end separator 26a. For example, as shown in FIGS. 14 and 15, at the coolant supply passage 30a, the second seal member 47 which is formed integrally with, or coated on the outer marginal region of the end separator 26a is partially peeled off. Specifically, part of the second seal member 47 forming protrusions and/or grooves of the flow grooves 42a of the coolant flow field 42 is cut away such that a metal surface portion at the coolant supply passage 30a as the current collector 152 is exposed to the outside. As a rust prevention structure, a plated portion 154 which has been subjected to gold plating treatment or platinum plating treatment is formed on the surface of the current collector 152.

Figure 16:
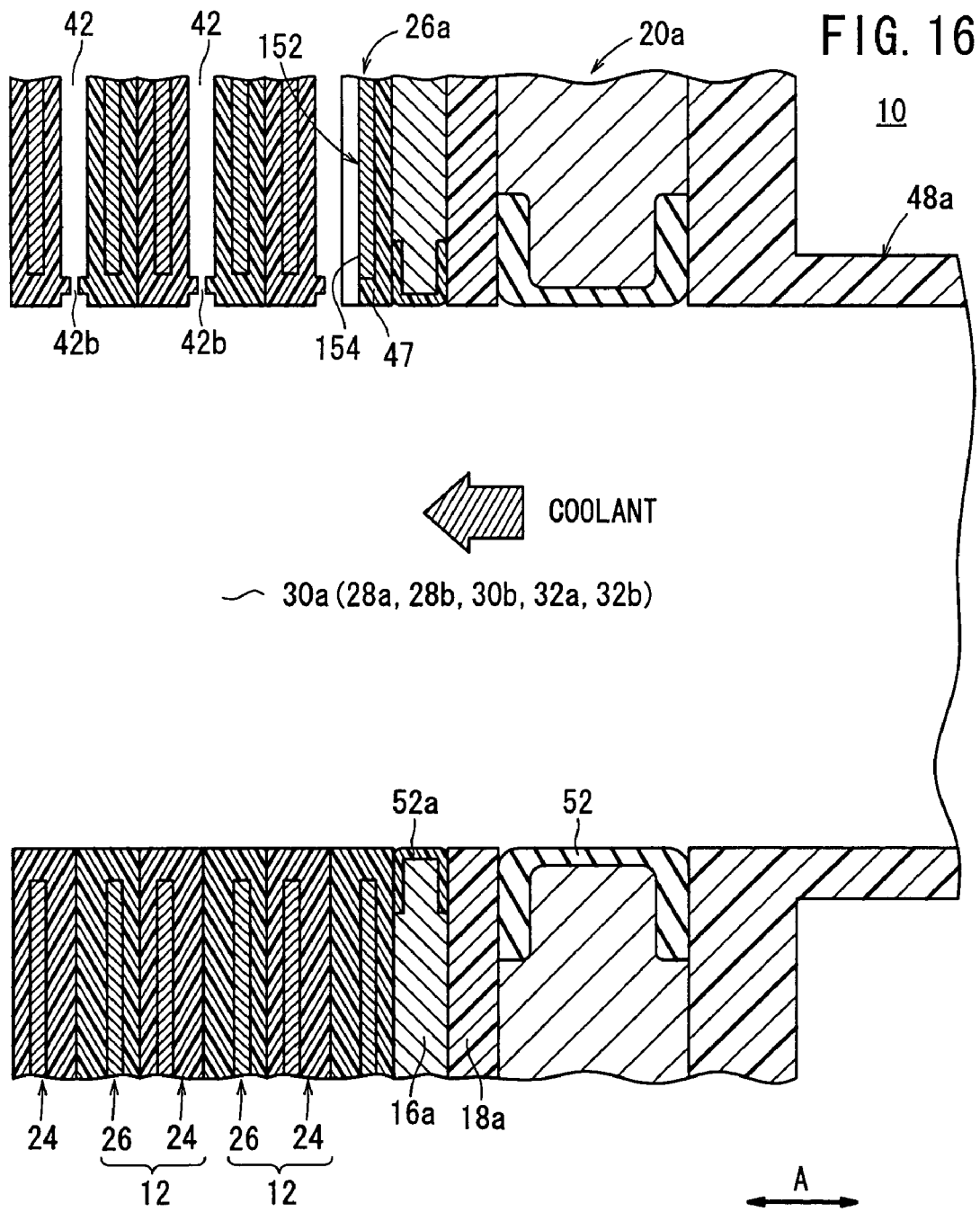
FIG. 16 is a cross sectional view taken along a coolant supply passage.

As shown in FIG. 16, insulating grommets 52a are attached to the terminal plate 16a, at the respective rectangular inner surfaces of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

In the sixth embodiment, as shown in FIG. 13, the current collectors 152 are provided integrally with the end separator 26a at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. The plated portion 154 is formed on the surface of the current collector 152.

Thus, for example, in the coolant supply passage 30a for supplying the coolant, the coolant directly contacts the current collector 152 of the end separator 26a, and it is possible to force the electrical current to flow through the coolant to the end separator 26a. Accordingly, in particular, the corrosion current flows through the end separator 26a and the terminal plate 16a, and the electrical corrosion in metal components such as the end separator 26a and the terminal plate 16a is inhibited effectively.

Figure 17:
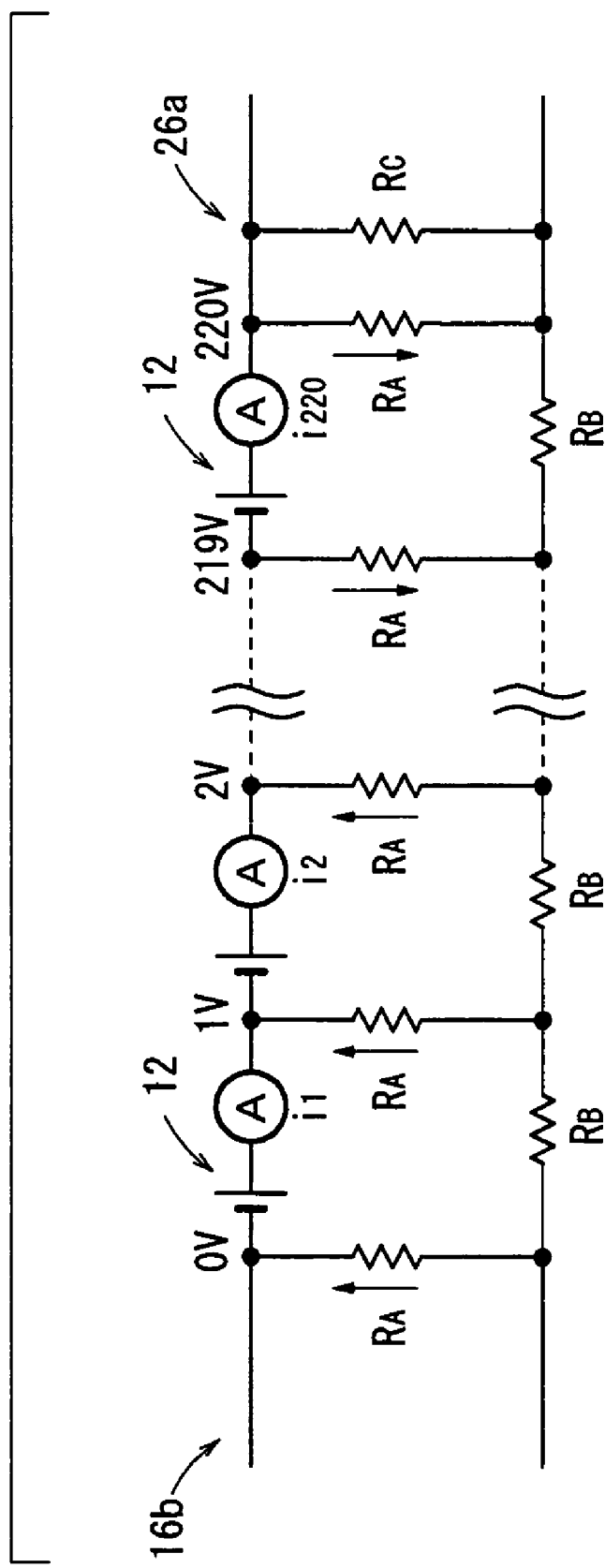
FIG. 17 is an equivalent circuit diagram of the part shown in FIG. 15.

Specific description in the case of the coolant supply passage 30a shown in FIG. 16 will be given below with reference to an equivalent circuit shown in FIG. 17.

The coolant flow field 42 formed between the power generation cells 12 is connected to the coolant supply passage 30a through an inlet (bridge) 42b. Therefore, as shown in FIG. 17, in each segment between the adjacent power generation cells 12, a liquid resistance $R_A$ of the inlet 42b is present, and a liquid resistance $R_B$ of the coolant supply passage 30a is present for each of the power generation cells 12.

For example, the number of the power generation cells 12 connected in series is 220, and each of the power generation cells 12 generates a voltage of 1V. At the end separator 26a on the high potential side, a reaction resistance $R_C$ of the current collector 152 is generated.

In this regard, a case where the current collectors 152 are provided on the end separator 26a (example 3 according to the present invention), and a case where no current collectors 152 are provided on the end separator 26a (conventional example) were examined. The example 3 and the conventional example were used for determining the relationship between the position of the power generation cell 12 and the corrosion current flowing through each coolant flow field 42. The result is shown in FIG. 18.

Figure 18:
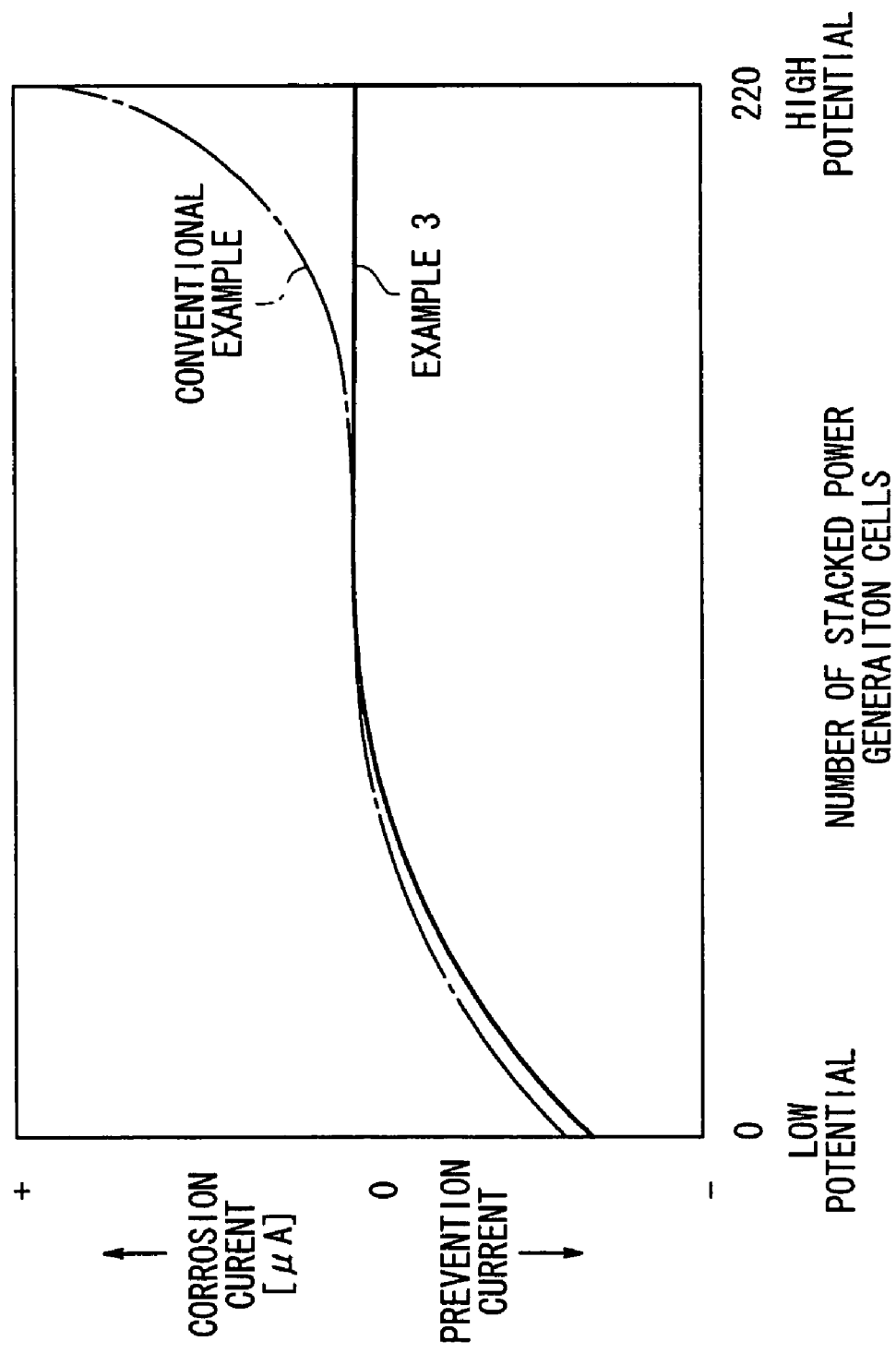
FIG. 18 is a graph showing the relationship between the number of power generation cells of the fuel cell stack and the corrosion current.

As can be seen from FIG. 18, in the conventional example, the corrosion current flowing through the coolant flow field 42 on the high potential side is considerably large. In contrast, in the example 3, since the current collectors 152 are provided on the high potential side, the current corresponding to the corrosion current is forced to flow through the current collectors 152. As a result, the amount of the corrosion current flowing through the coolant flow field 42 was reduced significantly.

Therefore, in the sixth embodiment, by providing the current collectors 152 for the end separator 26a on the high potential side, it is possible to reliably prevent the electrical corrosion in metal components such as the end separator 26a and the terminal plate 16a. Further, the current collector 152 is the metal surface portion exposed to the outside by partially peeling the second seal member 47 formed integrally with the end separator 26a. Thus, the structure of the current collector 152 is simple. The current collector 152 can be obtained economically.

Further, the current collectors 152 are provided at the lower portions of the fluid passages. Thus, it is possible to reduce the pressure losses in the oxygen-containing gas, the fuel gas, and the coolant flowing through the respective fluid passages.

Figure 19:
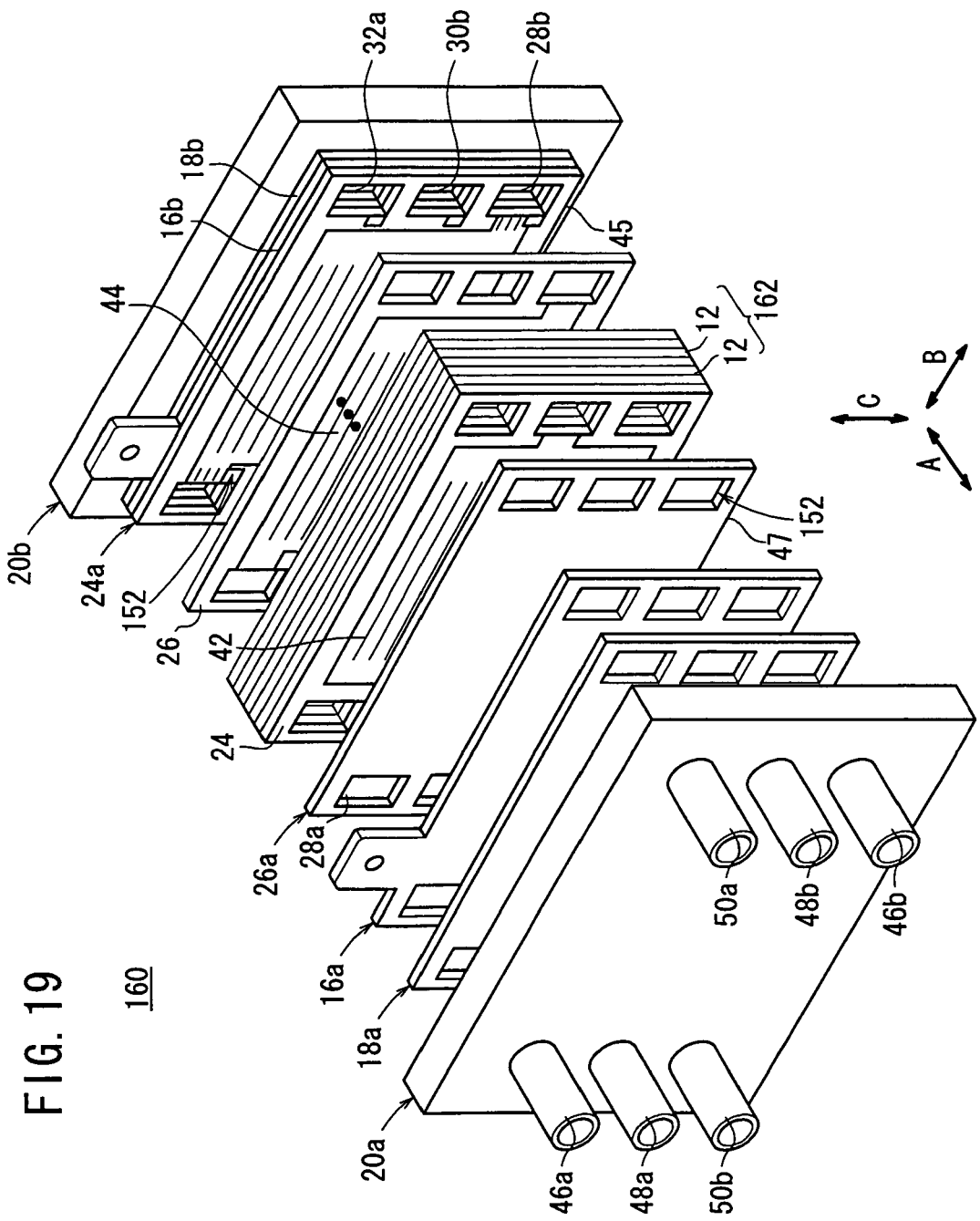
FIG. 19 is an exploded perspective view showing part of a fuel cell stack according to a seventh embodiment of the present invention.

FIG. 19 is an exploded perspective view showing part of a fuel cell stack 160 according to a seventh embodiment of the present invention.

A stack body 162 of the fuel cell stack 160 includes an end separator 26a stacked on the terminal plate 16a on the high potential side, and an end separator (first metal separator) 24a stacked on the terminal plate 16b on the low potential side. The current collectors 152 as described above are provided integrally with the end separators 24a, 26a, respectively.

Figure 20:
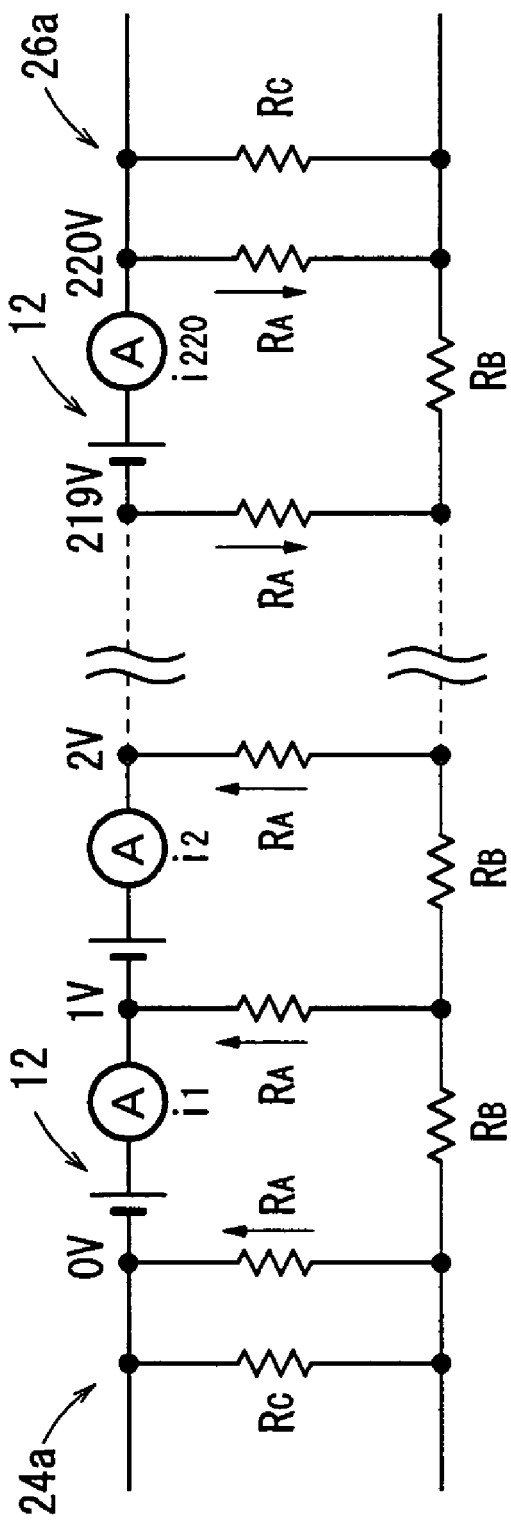
FIG. 20 is an equivalent circuit diagram at the coolant supply passage of the fuel cells tack.

In the seventh embodiment, the end separator 26a is provided on the high potential side (cathode side) of the stack body 162, and includes the current collectors 152 for reducing the corrosion current on the high potential side. The end separator 24a is provided on the low potential side (anode side) of the stack body 162, and includes the current collectors 152 for preventing the affect due to the low potential. Thus, as shown in FIG. 20, at the end separator 26a on the high potential side, a reaction resistance $R_C$ of the current collector 152 is generated. Likewise, at the end separator 24a on the low potential side, the reaction resistance $R_C$ of the current collector 152 is generated.

Figure 21:
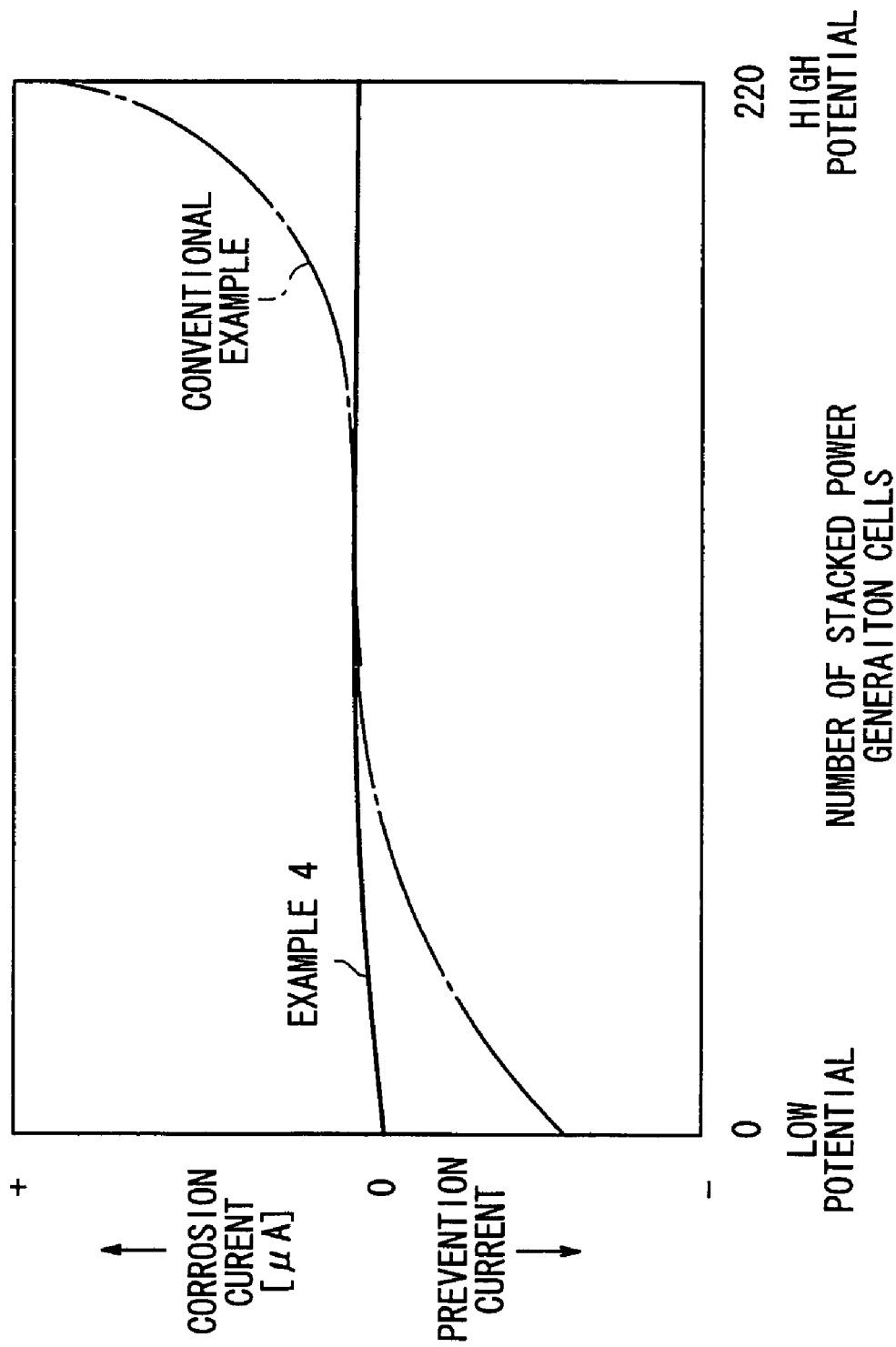
FIG. 21 is a graph showing the relationship between the number of power generation cells of the fuel cell stack, the corrosion current, and the protection current.

In this regard, the case of the conventional example described above, and a case where the current collectors 152 are provided on both of the end separators 24a, 26a (example 4 according to the present invention) were examined. The example 4 and the conventional example were used for determining the relationship between the position of the power generation cell 12 and the corrosion current flowing through each coolant flow field 42. The result is shown in FIG. 21.

In the example 4, the current collectors 152 are provided on the end separator 24a. As can be seen from FIG. 21, the prevention current on the low potential side is reduced significantly. Thus, the current value is approximately "0" from the low potential side to the high potential side. That is, it is possible to suitably reduce both of the corrosion current and the prevention current.

Figure 22:
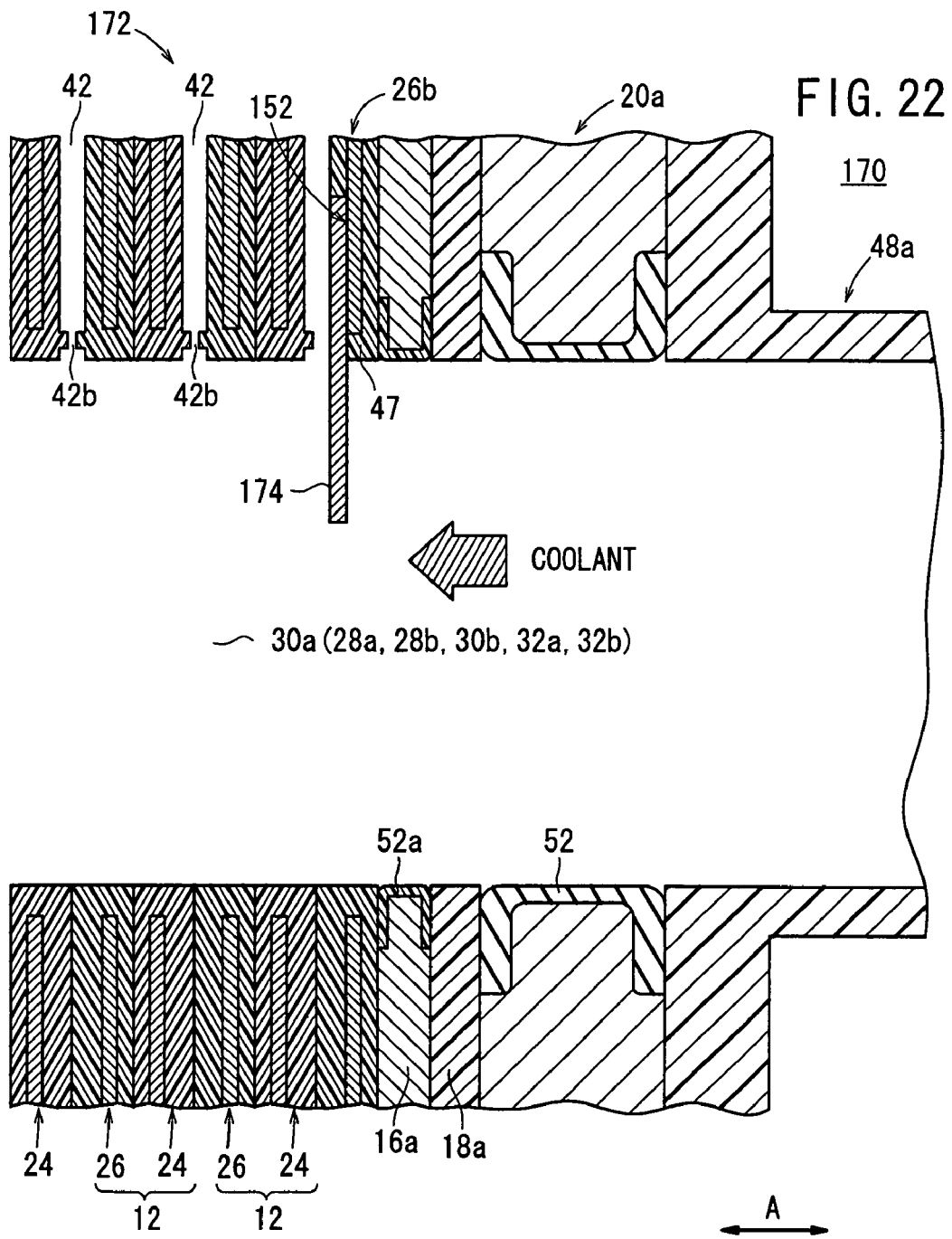
FIG. 22 is a cross sectional view showing part of a fuel cell stack according to an eighth embodiment of the present invention.

FIG. 22 is a cross sectional side view showing part of a fuel cell stack 170 according to an eighth embodiment of the present invention.

The fuel cell stack 170 has a stack body 172 including the end separator 26b stacked on the terminal plate 16a on the high potential side. Further, the stack body 172 has an end separator (not shown) on the low potential side, as necessary. At the end separator 26b, the second seal member 47 is partially peeled off for exposing the meal surface portion, and a current collecting member (current collector) 174 is joined to the metal surface portion by spot welding or the like. The current collecting member 174 has a rust prevention structure. For example, the current collecting member 174 is made of copper material which has been subjected to gold plating treatment, platinum, carbon, or vanadium.

FIG. 23 is a cross sectional side view showing part of a fuel cell stack 180 according to a ninth embodiment of the present invention.

The fuel cell stack 180 has a stack body 182 including an end separator 26c stacked on the terminal plate 16a on the high potential side. Further, the stack body 182 has an end separator (not shown) on the low potential side, as necessary. A current collecting member (current collector) 184 is joined to the end separator 26c by spot welding or the like except the region of the second seal member 47. The structure of the current collecting member 184 is the same as the structure of the current collecting member 174 as described above. Likewise, the structure of current collecting members used in tenth to thirteenth embodiments as described later is the same as the structure of the current collecting member 174.

Figure 24:
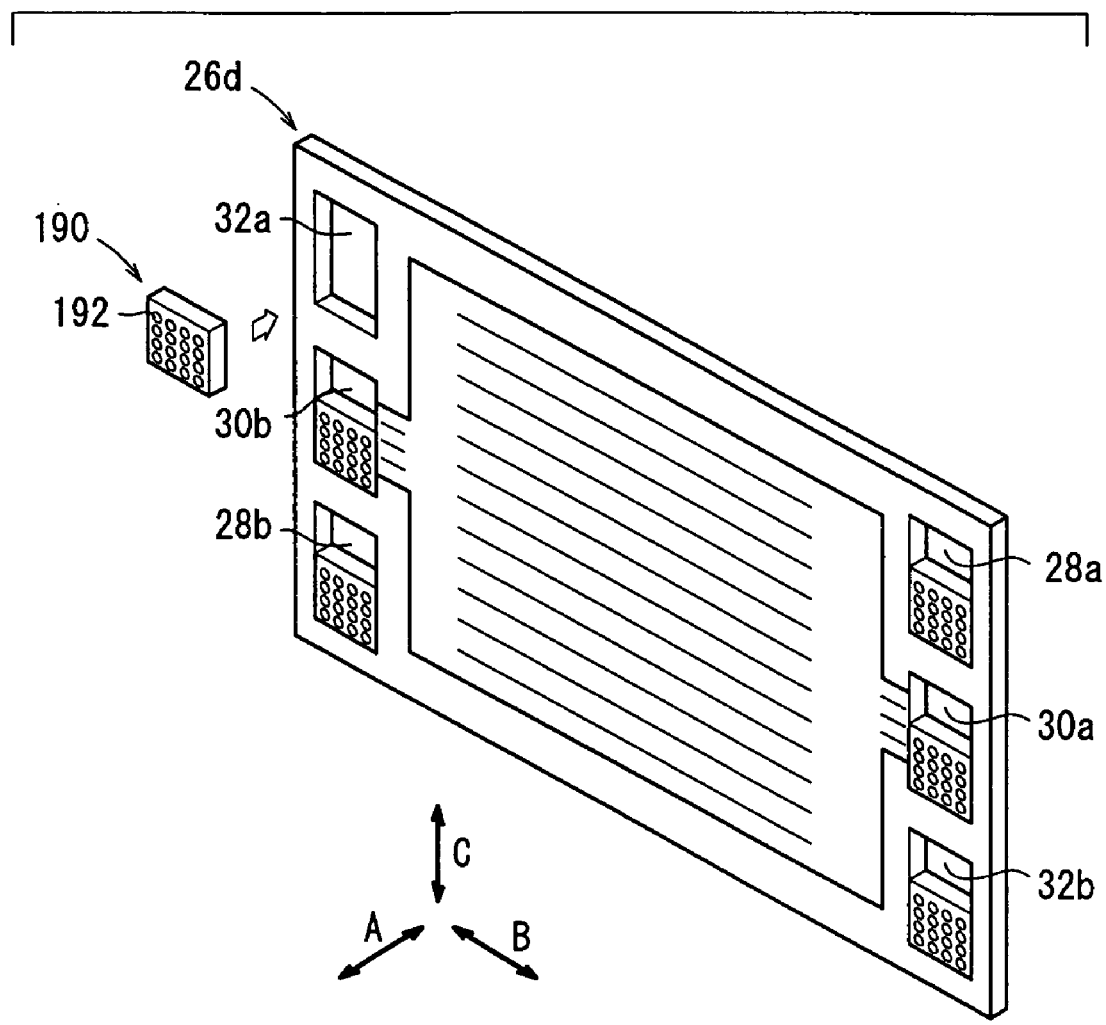
FIG. 24 is a perspective view showing an end separator of a fuel cell stack according to a tenth embodiment of the present invention.

FIG. 24 is a perspective view showing an end separator 26d of a fuel cell stack according to a tenth embodiment of the present invention.

The end separator 26d has current collecting members (current collectors) provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. The current collecting members 190 may be provided integrally with the end separator 26d. Alternatively, the current collecting members 190 may be provided separately from the end separator 26d. Each of the current collecting members 190 has a plurality of holes 192 for reducing the fluid resistance (pressure loss).

Figure 25:
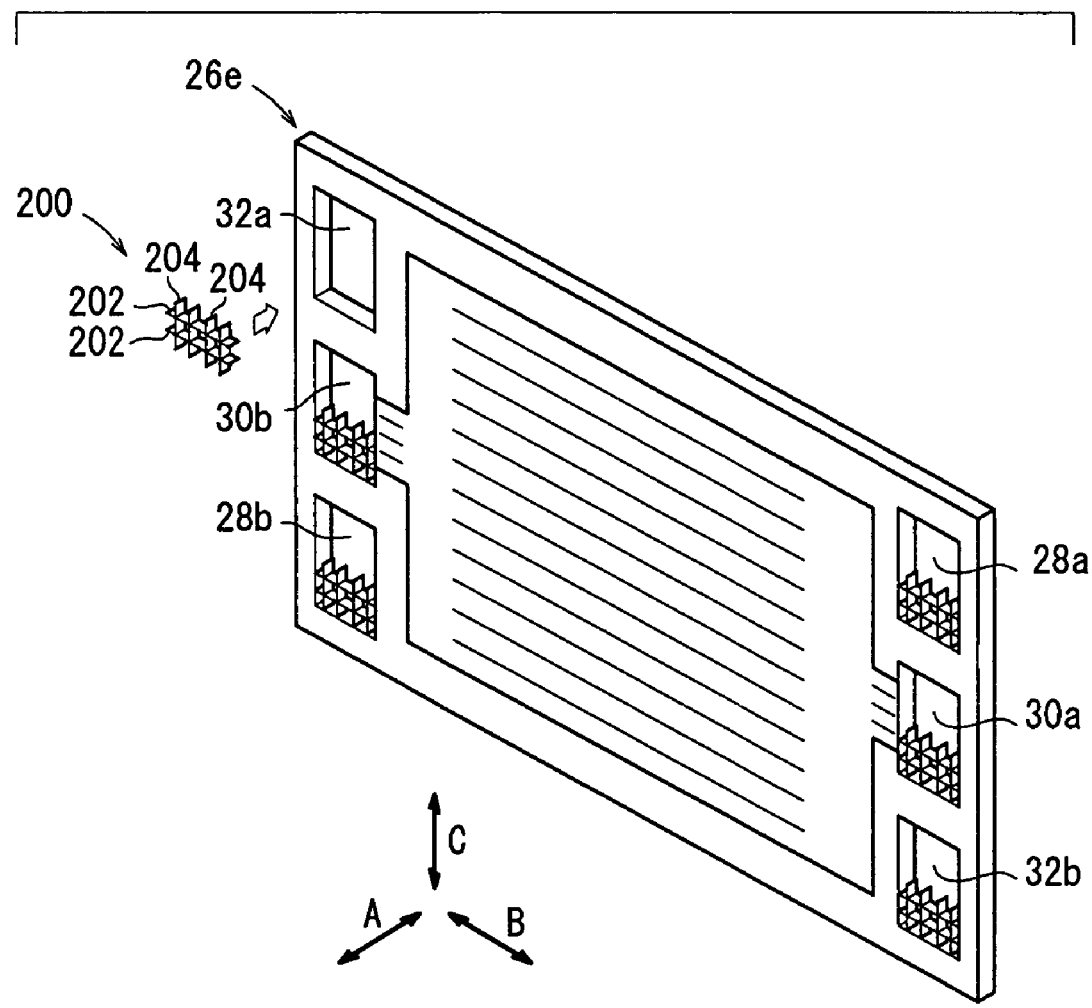
FIG. 25 is a perspective view showing an end separator of a fuel cell stack according to an eleventh embodiment of the present invention.

FIG. 25 is a perspective view showing an end separator 26e of a fuel cell stack according to an eleventh embodiment of the present invention.

The end separator 26e has fin members (current collectors) 200 provided at least at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. The fin members 200 may be provided integrally with the end separator 26e. Alternatively, the fin members 200 may be provided separately from the end separator 26e. Each of the fin members 200 includes a plurality of plate members 202 extending in the direction indicated by the arrow B and a plurality of plate members 204 extending in the direction indicated by the arrow C.

Figure 26:
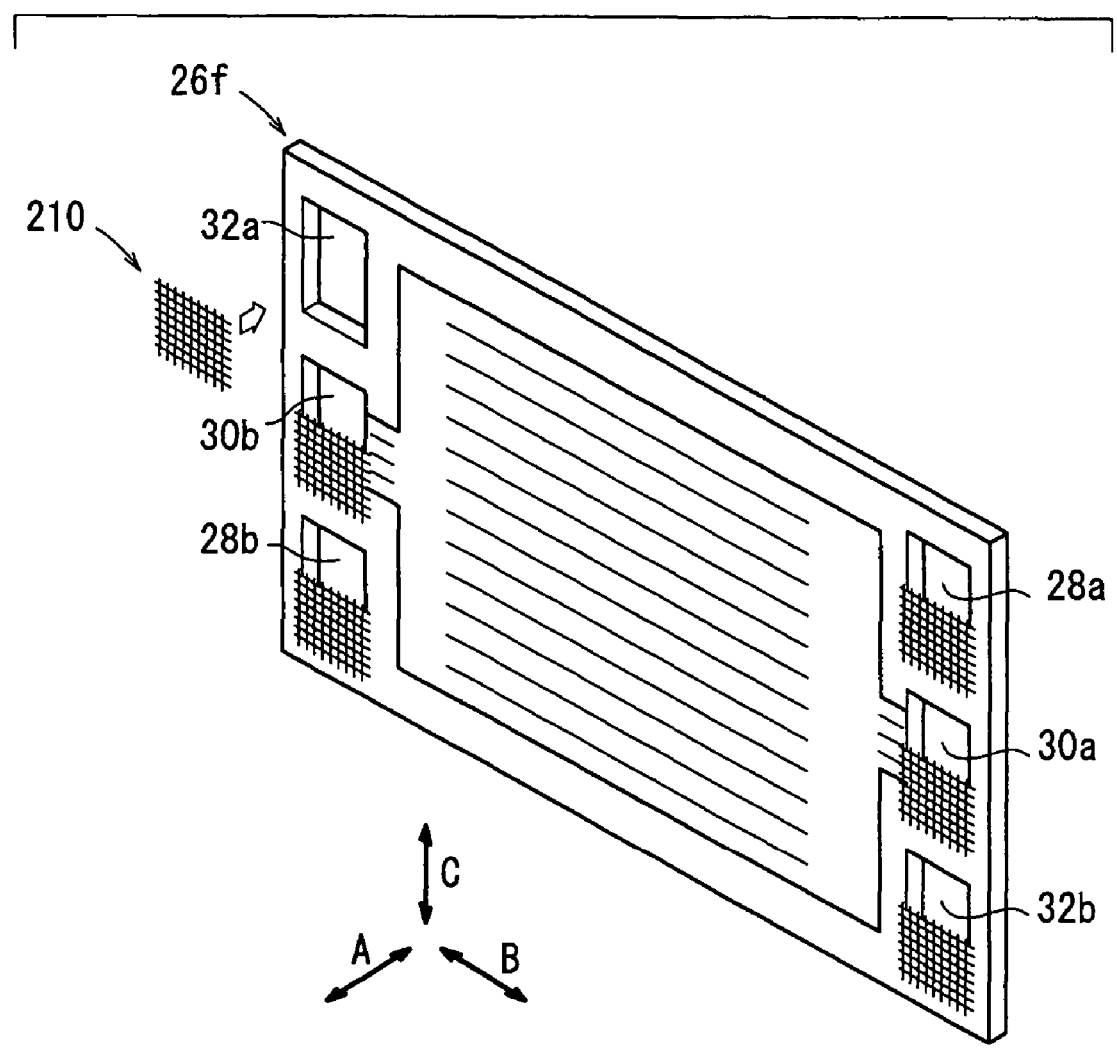
FIG. 26 is a perspective view showing an end separator of a fuel cell stack according to a twelfth embodiment of the present invention.

FIG. 26 is a perspective view showing an end separator 26f of a fuel cell stack according to a twelfth embodiment of the present invention.

On one surface of the end separator 26f, mesh members (current collectors) 210 are provided at lower portions of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b.

The mesh member 210 may be provided over the entire area of the opening of each fluid passage. Alternatively, the mesh member 210 may be provided only at the lower portion of the fluid passage.

Figure 27:
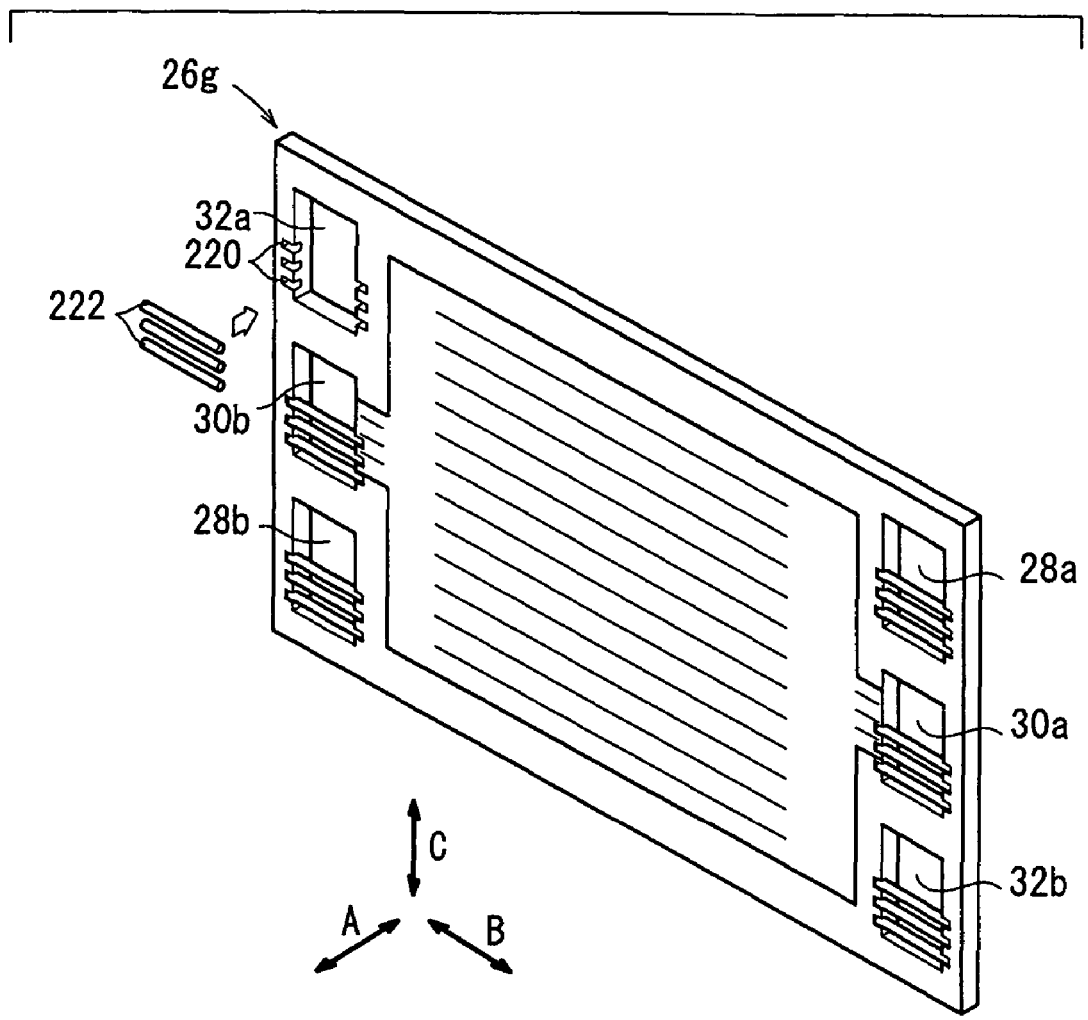
FIG. 27 is a perspective view showing an end separator of a fuel cell stack according to a thirteenth embodiment of the present invention.

FIG. 27 is a perspective view showing an end separator 26g of a fuel cell stack according to a thirteenth embodiment of the present invention.

On one surface of the end separator 26g, a plurality of grooves 220 extend in the direction indicated by the arrow B at each of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. A rod member (current collector) 222 is placed in each of the grooves 220, and the outer circumferential surface of the rod member 222 and the one surface of the end separator 26g are substantially in the same plane.

In the seventh through thirteenth embodiments, the same advantages as with the sixth embodiment can be obtained. For example, the current collectors directly contact the water produced in the reaction or the coolant for collecting electricity, and it is possible to prevent electrical corrosion in metal components.

Figure 28:
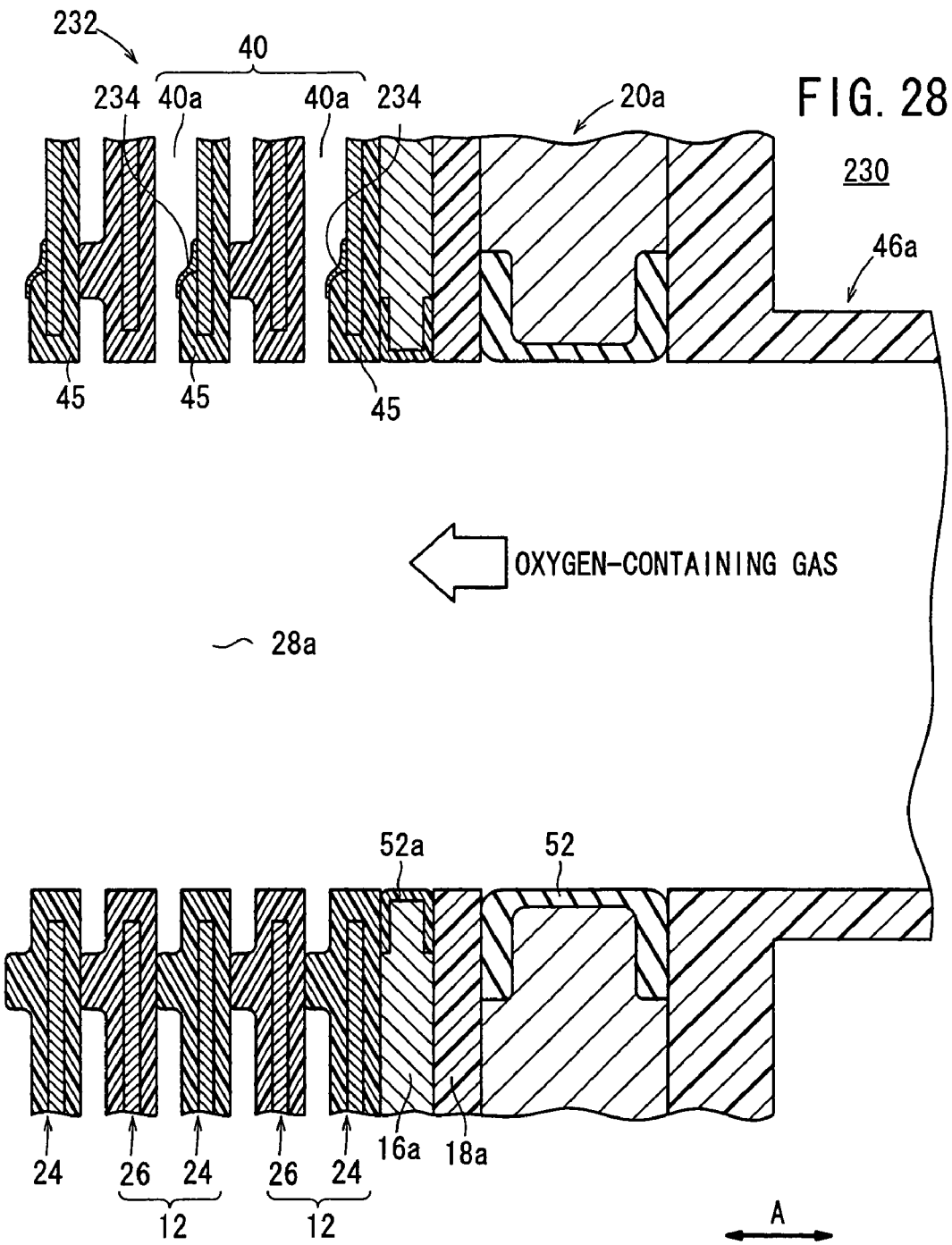
FIG. 28 is a cross sectional view showing part of a fuel cell stack according to a fourteenth embodiment of the present invention.

FIG. 28 is a cross sectional side view showing part of a fuel cell stack 230 according to a fourteenth embodiment of the present invention.

The fuel cell stack 230 includes a stack body 232. In the stack body 232, all (or a predetermined number) of the first metal separators 24 of the power generation cells 12 have current collectors 234. Each of the current collectors 234 covers a metal surface portion on the side of the flow grooves 40a and part of the first seal member 45. The current collector 234 is made of electrically conductive film, electrically conductive resin, electrically conductive adhesive, or electrically conductive coating material. For example, an anisotropy electrically conductive film may be used as the electrically conductive film. Specifically, for example, CF silane based adhesive containing carbon black may be used as the electrically conductive adhesive, for example, polypropylene based material containing carbon black may be used as the electrically conductive film, and for example, phenolic resin containing carbon black may be used as the electrically conductive resin.

In the fourteenth embodiment, all (or a predetermined number) of the first metal separators 24 of the power generation cells 12 have the current collectors 234. Thus, in the oxygen-containing gas flow field 40, the water produced in the reaction functions as the conductor, and it is possible to reliably prevent partial electrical corrosion due to the flow of the electrical current.

If relatively expensive material such as platinum or silver is used for the current collecting members 234, the current collecting members 234 need to be provided only, at least on the first metal separator 24 having the highest potential in the stack body 232. Thus, the current collectors 234 can be utilized economically.

Figure 29:
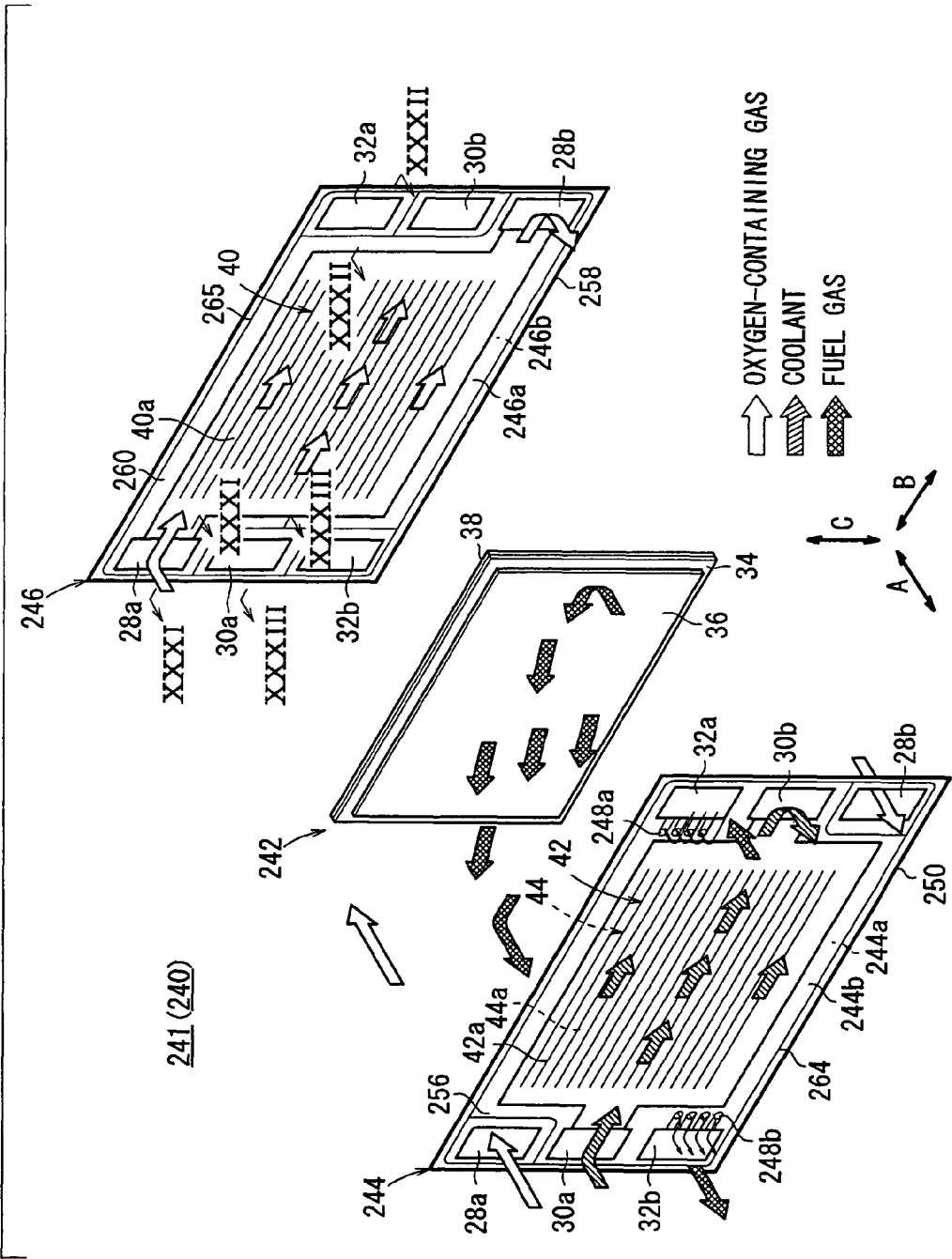
FIG. 29 is an exploded perspective view showing a power generation cell of a fuel cell stack according to a fifteenth embodiment of the present invention.

FIG. 29 is an exploded perspective view showing a power generation cell 241 of a fuel cell stack 240 according to a fifteenth embodiment of the present invention.

The power generation cell 241 includes a membrane electrode assembly (electrolyte electrode assembly) 242, and first and second metal separators 244, 246 sandwiching the membrane electrode assembly 242. The first and second metal separators 244, 246 are corrugated thin metal plate members. The surface area of the anode 36 is smaller than the surface area of the cathode 38 in the membrane electrode assembly 242.

The first metal separator 244 has a plurality of supply holes 248a near the fuel gas supply passage 32a, and a plurality of discharge holes 248b near the fuel gas discharge passage 32b.

Figure 30:
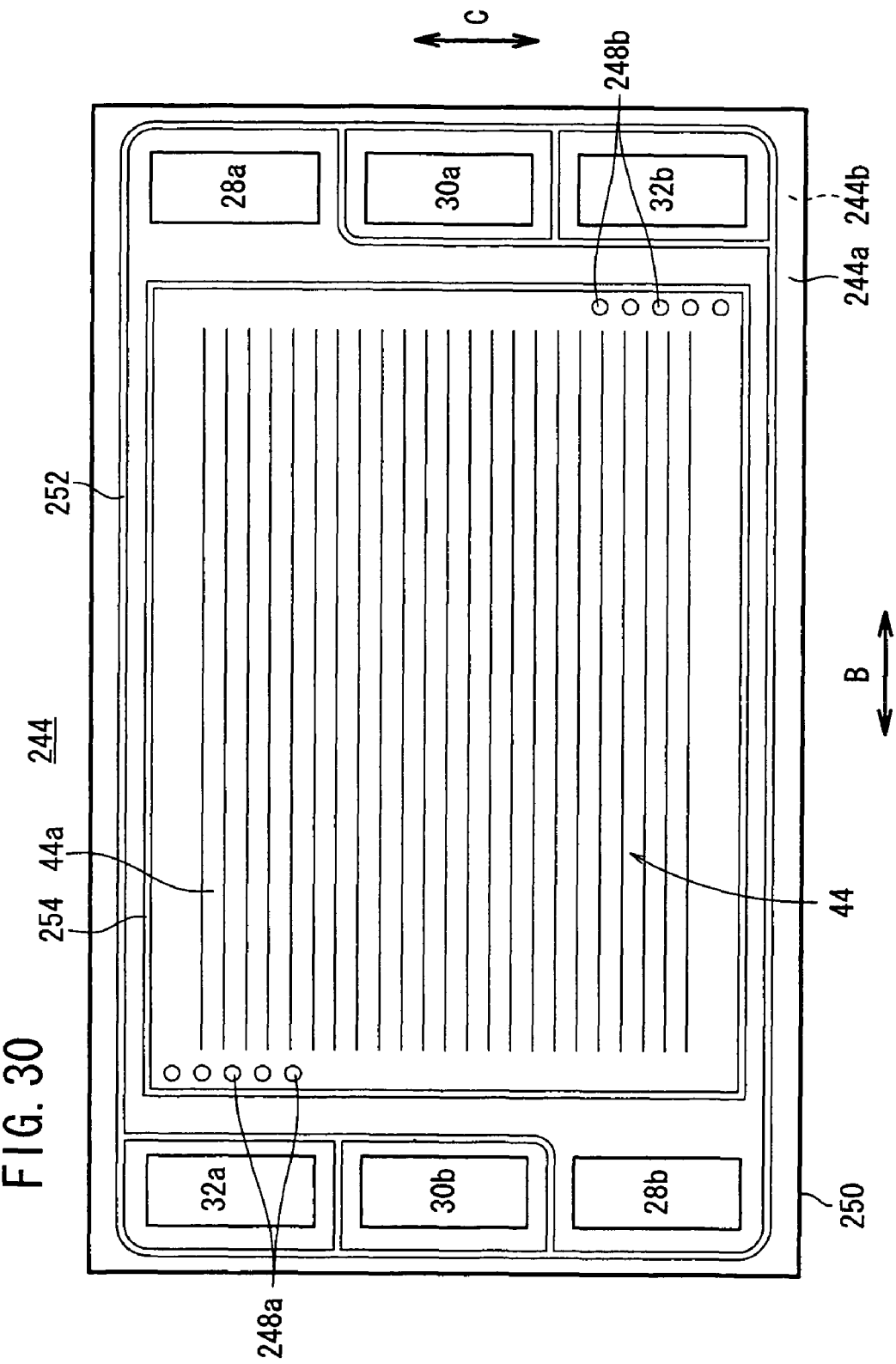
FIG. 30 is a front view showing a first metal separator of the power generation cell of the fuel cell stack.

As shown in FIGS. 29 and 30, a first electrically conductive seal (electrical conductive cover member) 250 is formed integrally on surfaces 244a, 244b of the first metal separator 244. The first electrically conductive seal 250 covers the outer marginal region of the first metal separator 244, and inner walls of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b. For example, the first electrically conductive seal 250 is made of silicone rubber containing carbon black as additive.

As shown in FIG. 30, the first electrically conductive seal 250 includes an outer seal section 252 and an inner seal section 254 formed integrally on the surface 244a. The outer seal section 252 prevents the leakage of the oxygen-containing gas, while allowing the oxygen-containing gas to flow from the oxygen-containing gas supply passage 28a to the oxygen-containing gas discharge passage 28b through the oxygen-containing gas flow field 40 of the second metal separator 246.

Figure 31:
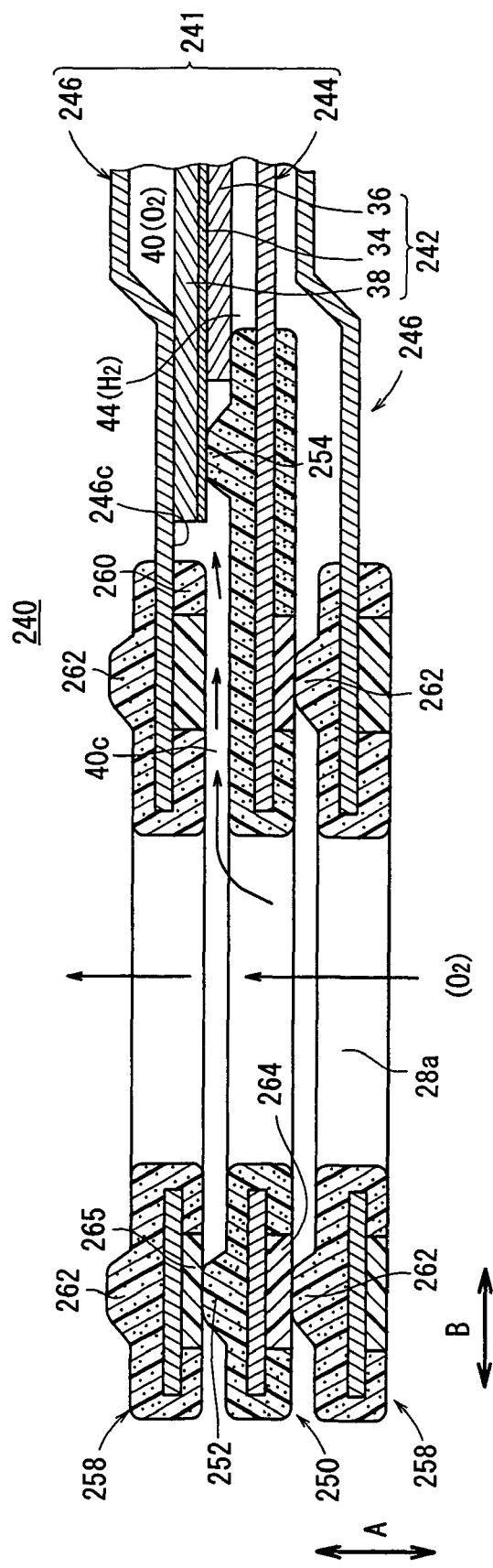
FIG. 31 is a cross sectional view showing the fuel cell stack, taken along a line XXXI-XXXI in FIG. 29.
Figure 32:
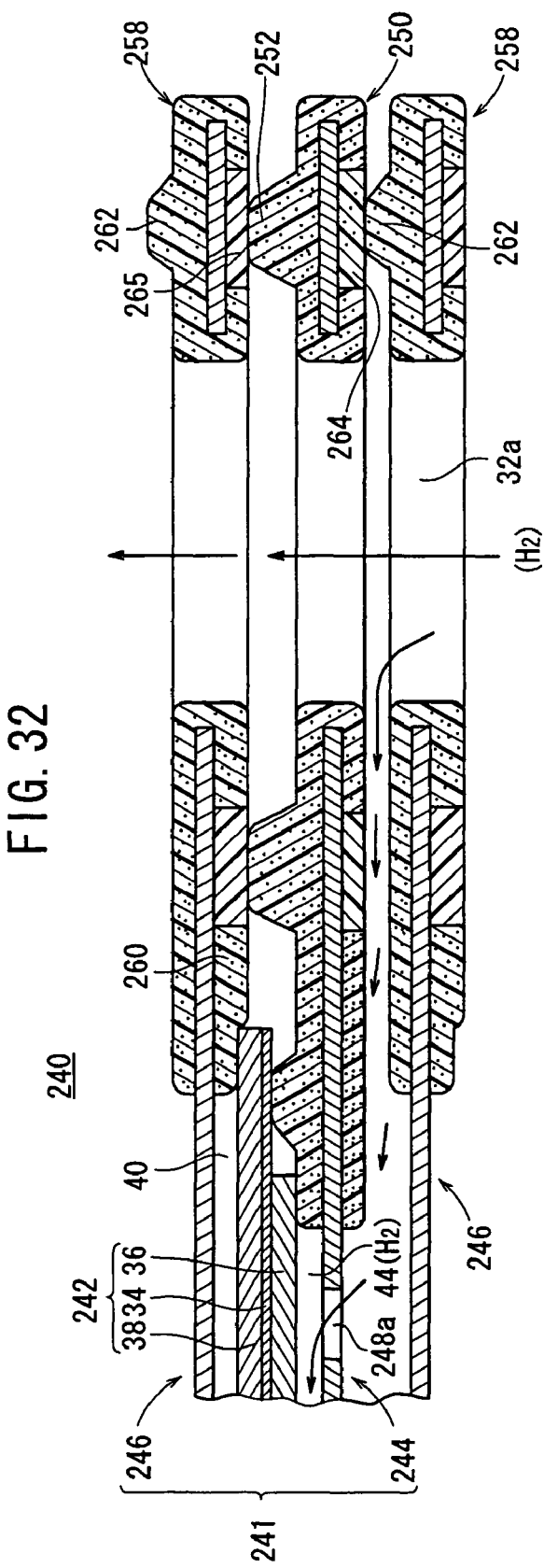
FIG. 32 is a cross sectional view showing the fuel cell stack, taken along a line XXXII-XXXII in FIG. 29.
Figure 33:
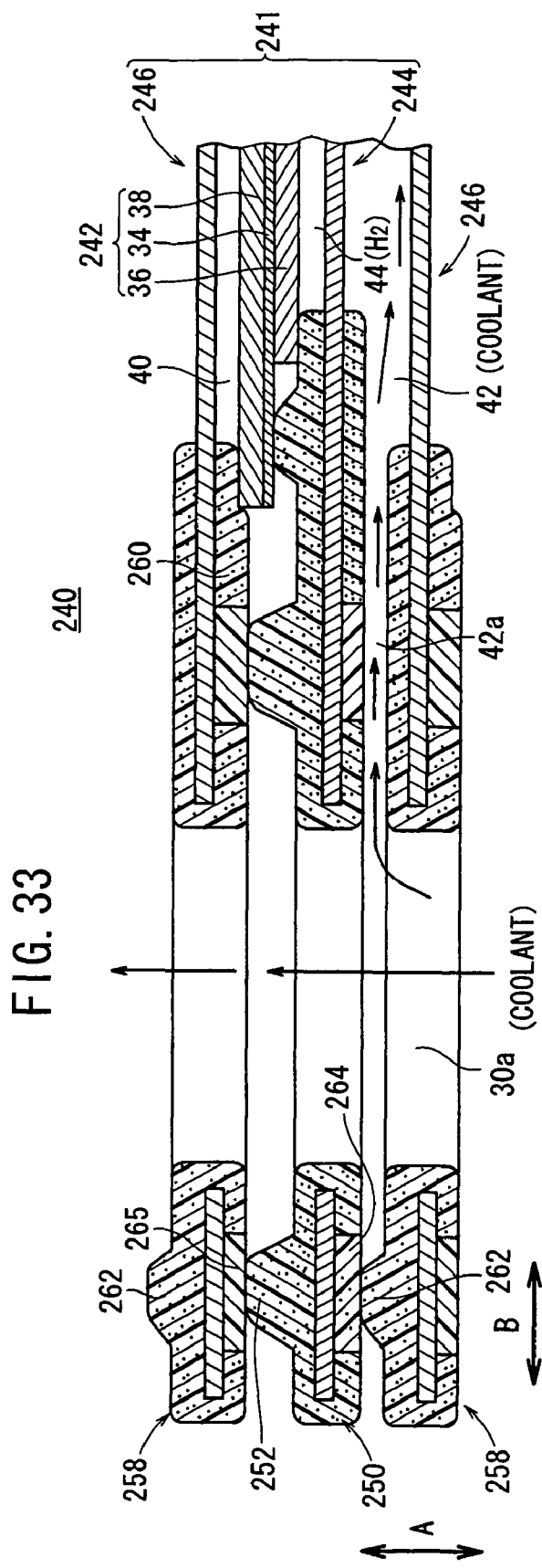
FIG. 33 is a cross sectional view showing the fuel cell stack, taken along a line XXXIII-XXXIII in FIG. 29.

As shown in FIGS. 31 to 33, the inner seal section 254 is provided outside the anode 36 of the membrane electrode assembly 242, and directly contacts the solid polymer electrolyte membrane 34 for separating the fuel gas flow field 44 from the oxygen-containing gas supply passage 28a, the oxygen-containing gas discharge passage 28b, the coolant supply passage 30a, and the coolant discharge passage 30b. As shown in FIG. 29, the first electrically conductive seal 250 includes a planar seal section 256 formed integrally on the surface 244b.

A second electrically conductive seal (electrical conductive cover member) 258 is formed integrally on surfaces 246a, 246b of the second metal separator 246. The second electrically conductive seal 258 covers the outer marginal region of the second metal separator 246, and inner walls of the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b (hereinafter also simply referred to as the "fluid passages").

Figure 34:
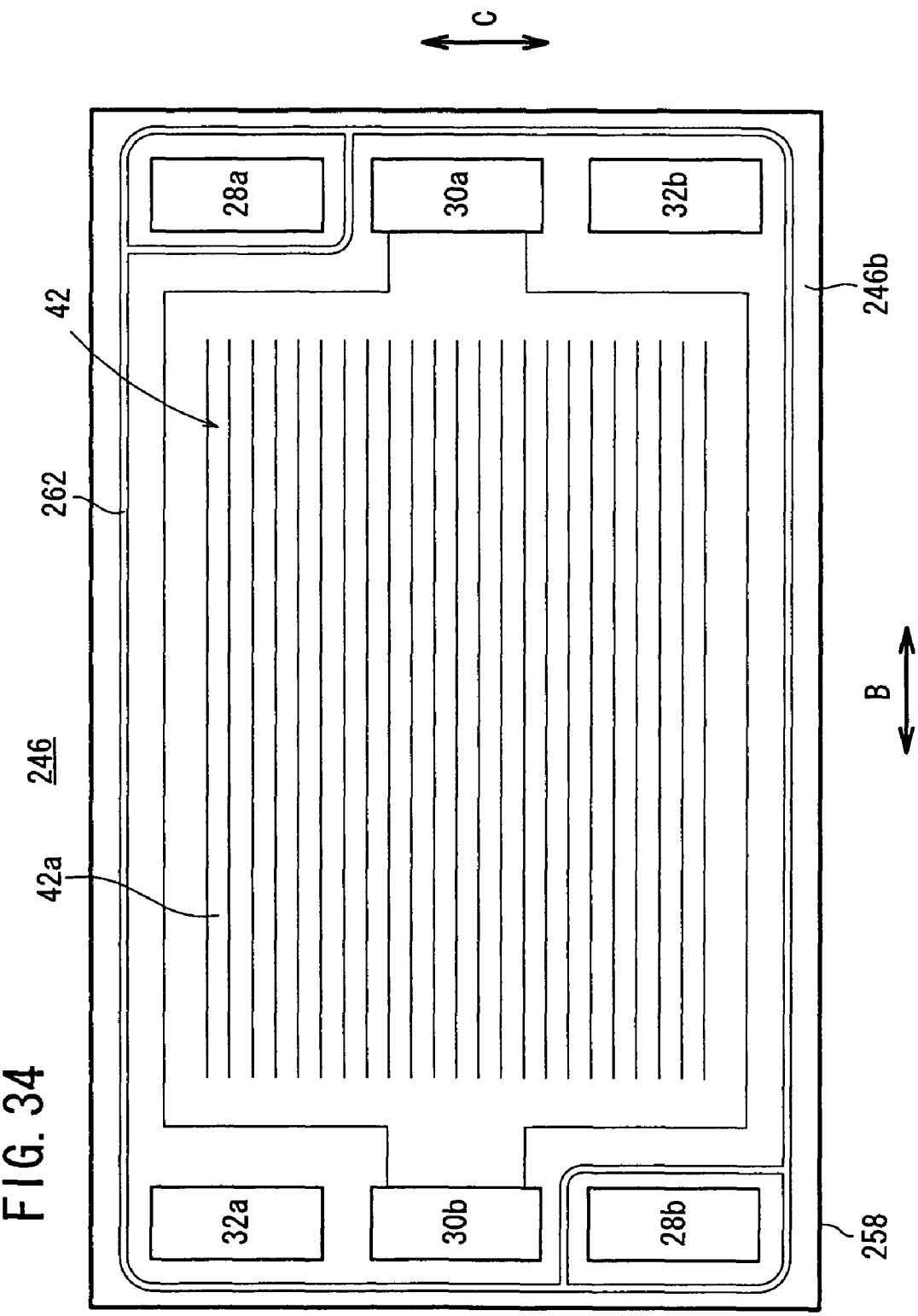
FIG. 34 is a front view showing a second metal separator of the power generation cell.
Figure 37:
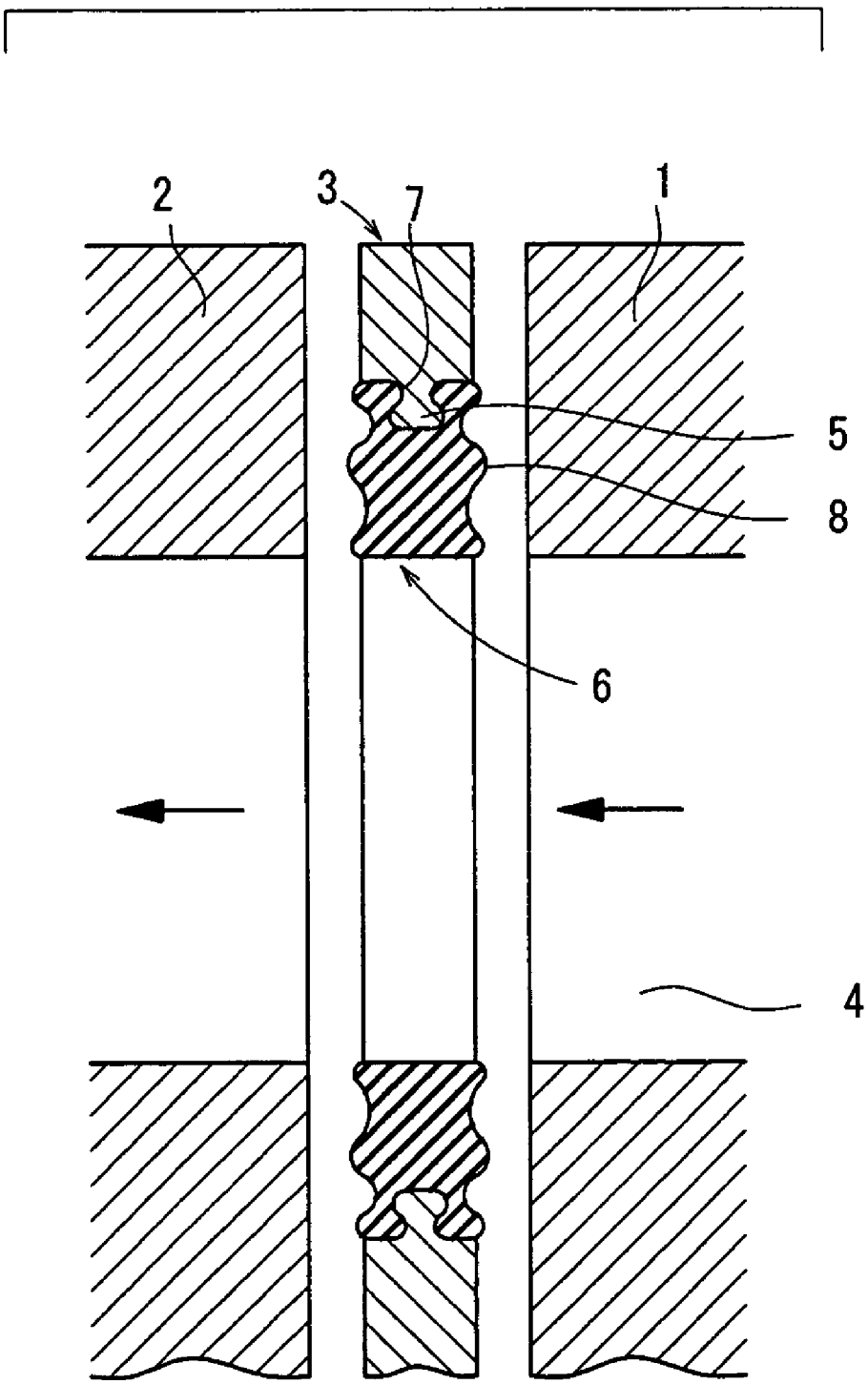
FIG. 37 is a cross sectional view showing part of a fuel cell stack disclosed in Japanese Laid-Open Patent Publication No. 2002-124292.
Figure 38:
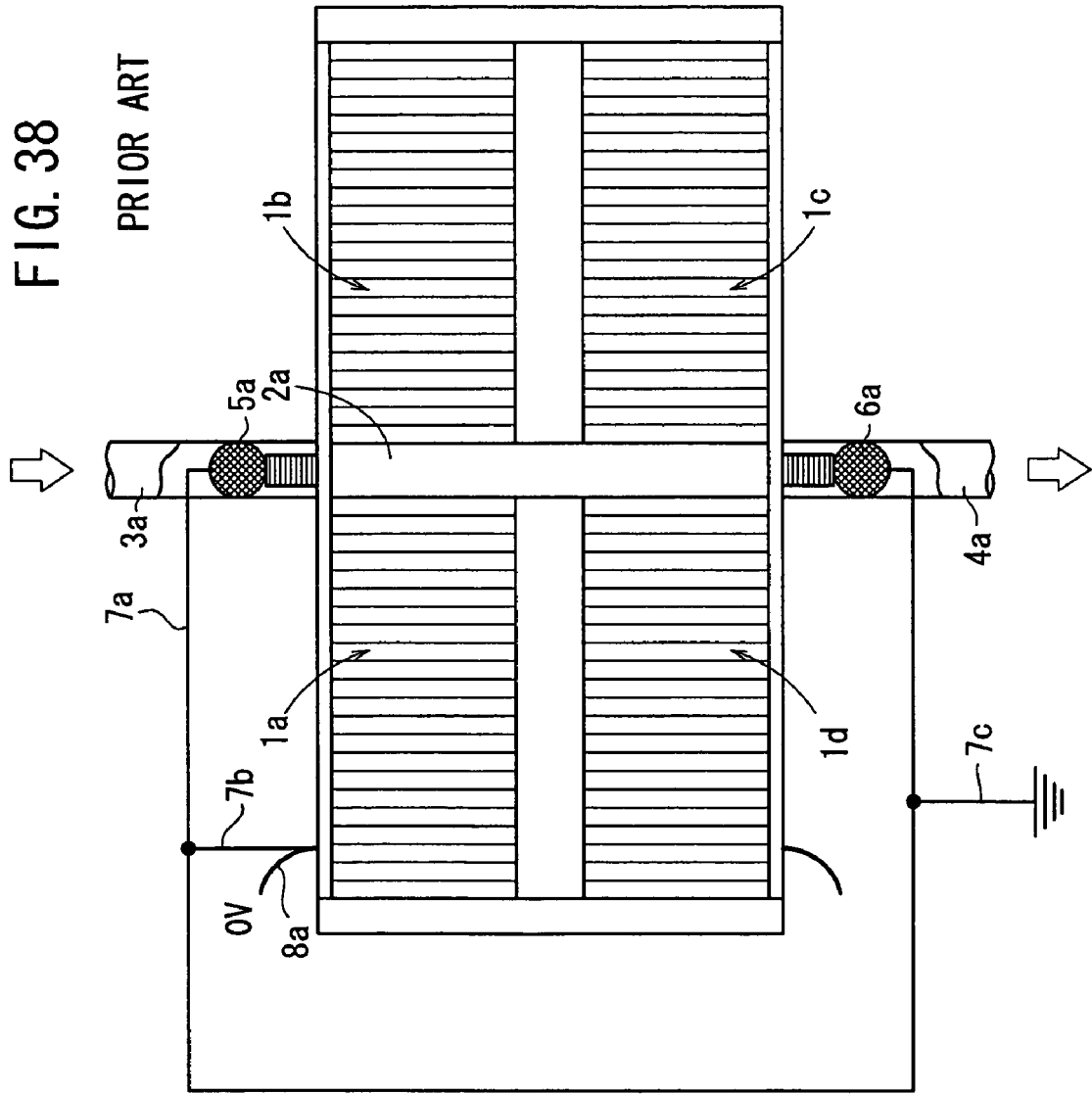
FIG. 38 is a cross sectional view showing part of a fuel cell stack disclosed in Japanese Laid-Open Patent Publication No. 2001-155761.

The structure of the second electrically conductive seal 258 is the same as the structure of the first electrically conductive seal 250. The second electrically conductive seal 258 includes a planar seal section 260 formed integrally on the surface 246a and a ridge seal section 262 formed integrally on the surface 246b for preventing the leakage of the coolant, while allowing the coolant to flow from the coolant supply passage 30a to the coolant discharge passage 30b through the coolant flow field 42 (see FIGS. 33 and 34).

On the surface 244b of the first metal separator 244, an insulating member 264 is provided at a position corresponding to the position of the seal section 262 on the surface 246b of the second metal separator 246. For example, the insulating member 264 is made of only silicone rubber. As shown in FIGS. 31 through 33, the seal section 262 directly contacts the insulating member 264. The width of the insulating member 264 is larger than the width of the front end portion of the seal section 262.

On the surface 246a of the second metal separator 246, an insulating member 265 is provided at a position corresponding to the position of the outer seal section 252 on the surface 244a of the first metal separator 244 (see FIG. 29). For example, the insulating member 265 is only made of silicone rubber. The outer seal section 252 directly contacts the insulating member 265. The width of the insulating member 264 is larger than the width of the front end portion of the outer seal section 252 (see FIGS. 31 through 33).

In the fuel cell stack 240, as shown in FIGS. 29 and 31, the oxygen-containing gas flows from the oxygen-containing gas supply passage 28a to the oxygen-containing gas flow field 40 of the second metal separator 246 through a passage 40c, and flows along the cathode 38 of the membrane electrode assembly 242. Further, as shown FIGS. 29 and 32, the fuel gas flows from the fuel gas supply passage 32a to the fuel gas flow field 44 of the first metal separator 244 through supply holes 248a, and flows along the anode 36 of the membrane electrode assembly 242.

Thus, in each of the membrane electrode assemblies 242, the oxygen-containing gas supplied to the cathode 38, and the fuel gas supplied to the anode 36 are consumed in the electrochemical reactions at catalyst layers of the cathode 38 and the anode 36 for generating electricity.

In the fifteenth embodiment, the first and second electrically conductive seals 250, 258 are formed integrally on the first and second metal separators 244, 246, respectively. The first and second electrically conductive seals 250, 258 cover the inner walls of the oxygen-containing gas supply passage 28a, the coolant supply passage 30a, the fuel gas discharge passage 32b, the fuel gas supply passage 32a, the coolant discharge passage 30b and the oxygen-containing gas discharge passage 28b.

For example, as shown in FIG. 31, in the oxygen-containing gas supply passage 28a, the second electrically conductive seal 258 is provided near the oxygen-containing gas supply passage 28a in comparison with an exposed metal portion 246c of the second metal separator 246. Thus, during operation of the fuel cell stack 240, the electrical current flows preferentially into the second electrically conductive seal 258 which is the nearest electrically conductive portion from the oxygen-containing gas supply passage 28a. Thus, it is possible to effectively prevent the corrosion current from flowing through the second metal separator 246. Accordingly, with the simple and economical structure, it is possible to reliably inhibit the electrical corrosion in the second metal separator 246.

Further, in the second metal separator 246, it is possible to prevent elution of metal ions around the oxygen-containing gas supply passage 28a. Thus, the power generation performance is not lowered due to the decrease in the number of ions exchanged through the solid polymer electrolyte membrane 34, and it is possible to prevent the degradation of the solid polymer electrolyte membrane 34 itself.

Further, as shown in FIGS. 31 through 33, the insulating members 264, 265 are provided at the portions where the first metal separator 244 contacts the second metal separator 246, i.e., at the portions where the first electrically conductive seal 250 contacts the second electrically conductive seal 258. That is, the outer seal section 252 of the first electrically conductive seal 250 contacts the insulating member 265, and the seal section 262 of the second electrically conductive seal 258 contacts the insulating member 264. It is possible to prevent the electrical connection between the first electrically conductive seal 250 and the second electrically conductive seal 258. Accordingly, the short circuit between the first and second metal separators 244, 246 is prevented, and the desired power generation performance can be maintained.

In the coolant supply passage 30a, the fuel gas discharge passage 32b, the fuel gas supply passage 32a, the coolant discharge passage 30b, and the oxygen-containing gas discharge passage 28b, the same advantages as in the case of the oxygen-containing gas supply passage 28a can be obtained.

FIG. 35 is a cross sectional view showing part of a fuel cell stack 280 according to a sixteenth embodiment of the present invention. In the fuel cell stack 280, electrically conductive grommets (electrically conductive cover members) 282 are attached to the terminal plates (metal plate members) 16a, 16b. The electrically conductive grommets 282 cover the inner walls of the fluid passages including the oxygen-containing gas supply passage 28a. For example, the electrically conductive grommet 282 is made of silicone rubber containing carbon black as additive.

FIG. 36 is a cross sectional view showing part of a fuel cell stack 290 according to a seventeenth embodiment of the present invention.

In the fuel cell stack 290, electrically conductive grommets (electrically conductive cover members) 292 are attached to the end plates (metal plate members) 20a, 20b. The electrically conductive grommets 292 cover the inner walls of the fluid passages including the oxygen-containing gas supply passage 28a. The structure of the electrically conductive grommet 292 is the same as the structure of the electrically conductive grommet 282.

As described above, in the sixteenth embodiment, the electrically conductive grommets 282 are attached to the terminal plates 16a, 16b, and in the seventeenth embodiment, the electrically conductive grommets 292 are attached to the end plates 20a, 20b. Thus, the electrical current flows preferentially into the electrically conductive grommets 282, 292 which are the nearest electrically conductive portion from the respective fluid passages including the oxygen-containing gas supply passage 28a. Thus, it is possible to effectively prevent the electrical current from flowing outside the fuel cell stacks 280, 290. Accordingly, insulating performance is suitably maintained in the fuel cell stacks 280, 290.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A solid polymer electrolyte fuel cell stack comprising:
a plurality of electrolyte electrode assemblies and a plurality of separators stacked alternately in a stacking direction, said electrolyte electrode assemblies each including a pair of electrodes, and an electrolyte interposed between said electrodes;
one or more fluid passages for coolant and reactant gases extending in the stacking direction through at least the plurality of separators of said fuel cell stack, the one or more fluid passages including an electrically conductive fluid flowing therein; and a corrosion current collector provided at said one or more fluid passages to collect corrosion current in the electrically conductive fluid flowing through said one or more fluid passages, wherein said corrosion current collector is electrically parallel with a liquid having a liquid resistance that is present on a surface of at least one of said separators in said fuel cell stack at least on a high potential side in the stacking direction of a stack body formed by stacking said electrolyte electrode assemblies and said separators alternately.

2. A solid polymer electrolyte fuel cell stack according to claim 1, wherein said corrosion current collector comprises an electrically conductive plate member, an electrically conductive mesh member, an electrically conductive fin member, or an electrically conductive rod member.

3. A solid polymer electrolyte fuel cell stack according to claim 1, wherein terminal plates are provided at opposite ends in the stacking direction, insulating plates are provided outside said terminal plates, and end plates are provided outside said insulating plates; and said corrosion current collector is provided at any one of said terminal plates, said end plates, and said separators.

4. A solid polymer electrolyte fuel cell stack according to claim 3, wherein said insulating plate has a recess accommodating said terminal plate at a position inside said fluid passage where said corrosion current collector is provided; and said corrosion current collector is electrically connected to said terminal plate through a connection terminal.

5. A solid polymer electrolyte fuel cell stack according to claim 1, wherein said separator comprises a metal plate, and a seal member is provided to cover an inner wall of said fluid passage; and said corrosion current collector is a metal surface portion of said separator which is provided at said fluid passage and formed by cutting said seal member partially.

6. A solid polymer electrolyte fuel cell stack according to claim 1, wherein said separator comprises a metal plate, and a seal member is provided to cover an inner wall of said fluid passage; and said corrosion current collector is a metal member jointed to a metal surface portion of said metal plate such that said corrosion current collector is positioned at said fluid passage.

7. A solid polymer electrolyte fuel cell stack according to claim 1, wherein said corrosion current collector has a rust prevention structure.

8. A solid polymer electrolyte fuel cell stack according to claim 1, wherein said separator comprises a metal plate, and a seal member is provided to cover an inner wall of said fluid passage; and said corrosion current collector is provided in a region including a metal surface portion of said metal plate and part of said seal member.

9. A solid polymer electrolyte fuel cell stack according to claim 8, wherein said corrosion current collector comprises an electrically conductive film, or is made of electrically conductive adhesive or electrically conductive coating material.

* * * * *